United States Patent
Sugiyama

(10) Patent No.: US 10,551,642 B2
(45) Date of Patent: Feb. 4, 2020

(54) TUNABLE LIGHT SOURCE, OPTICAL MODULE, AND METHOD FOR CONTROLLING TUNABLE LIGHT SOURCE

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/050,347

(22) Filed: Jul. 31, 2018

(65) Prior Publication Data

US 2019/0041670 A1 Feb. 7, 2019

(30) Foreign Application Priority Data

Aug. 3, 2017 (JP) ................................ 2017-151026

(51) Int. Cl.
*G02F 1/01* (2006.01)

(52) U.S. Cl.
CPC ........ *G02F 1/0147* (2013.01); *G02F 2201/58* (2013.01); *G02F 2203/055* (2013.01)

(58) Field of Classification Search
CPC . G02F 1/011; G02F 2201/58; G02F 2203/055
See application file for complete search history.

(56) References Cited

U.S. PATENT DOCUMENTS

| | | | |
|---|---|---|---|
| 2003/0072009 A1* | 4/2003 | Domash | G02B 6/29311 356/519 |
| 2008/0193145 A1 | 8/2008 | Yokoyama | |
| 2010/0284649 A1* | 11/2010 | Ishii | G02F 1/0147 385/31 |
| 2012/0207479 A1* | 8/2012 | Krishnamoorthy | H04B 10/506 398/85 |
| 2013/0094527 A1 | 4/2013 | Fukuda et al. | |
| 2014/0285798 A1* | 9/2014 | Nishimura | G01J 3/26 356/300 |
| 2015/0208911 A1* | 7/2015 | Funamoto | A61B 3/0008 351/221 |
| 2017/0149209 A1* | 5/2017 | Uesaka | H01S 5/0687 |

* cited by examiner

*Primary Examiner* — Thomas A Hollweg
*Assistant Examiner* — Mary A El-Shammaa
(74) *Attorney, Agent, or Firm* — Staas & Halsey LLP

(57) ABSTRACT

A tunable light source includes a substrate; a light source; a wavelength selecting device that selects, according to a control signal, output light with a specific wavelength from light output from the light source; a wavelength filter that is disposed on the substrate, filters the output light, and outputs the filtered light; a light-receiving device that receives the filtered light from the wavelength filter; and a controller configured to generate the control signal based on an output transmittance corresponding to a quantity of the received light received by the light-receiving device, a first transmittance corresponding to a target wavelength, a second transmittance corresponding to a shorter-wavelength limit of a control range including the target wavelength, and a third transmittance corresponding to a longer-wavelength limit of the control range, and output the generated control signal to the wavelength selecting device.

6 Claims, 23 Drawing Sheets

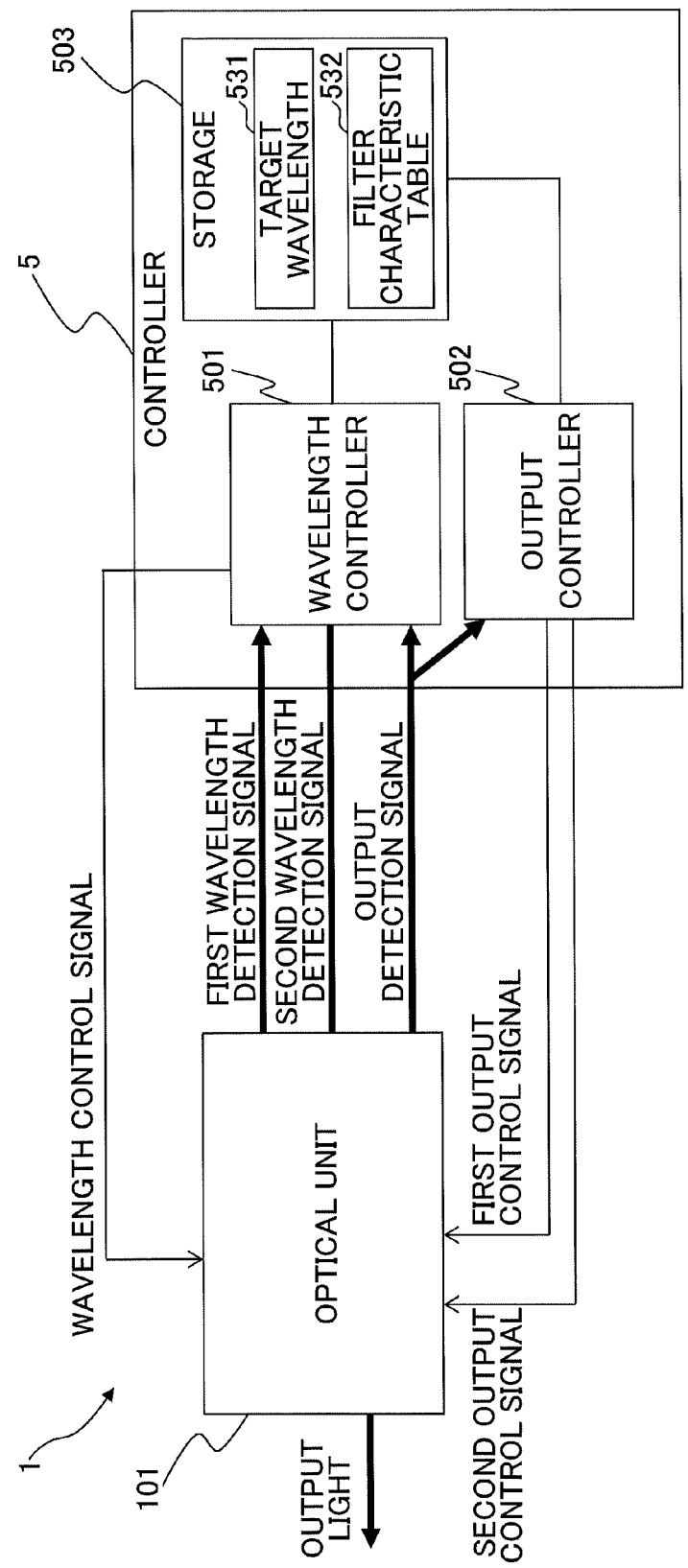

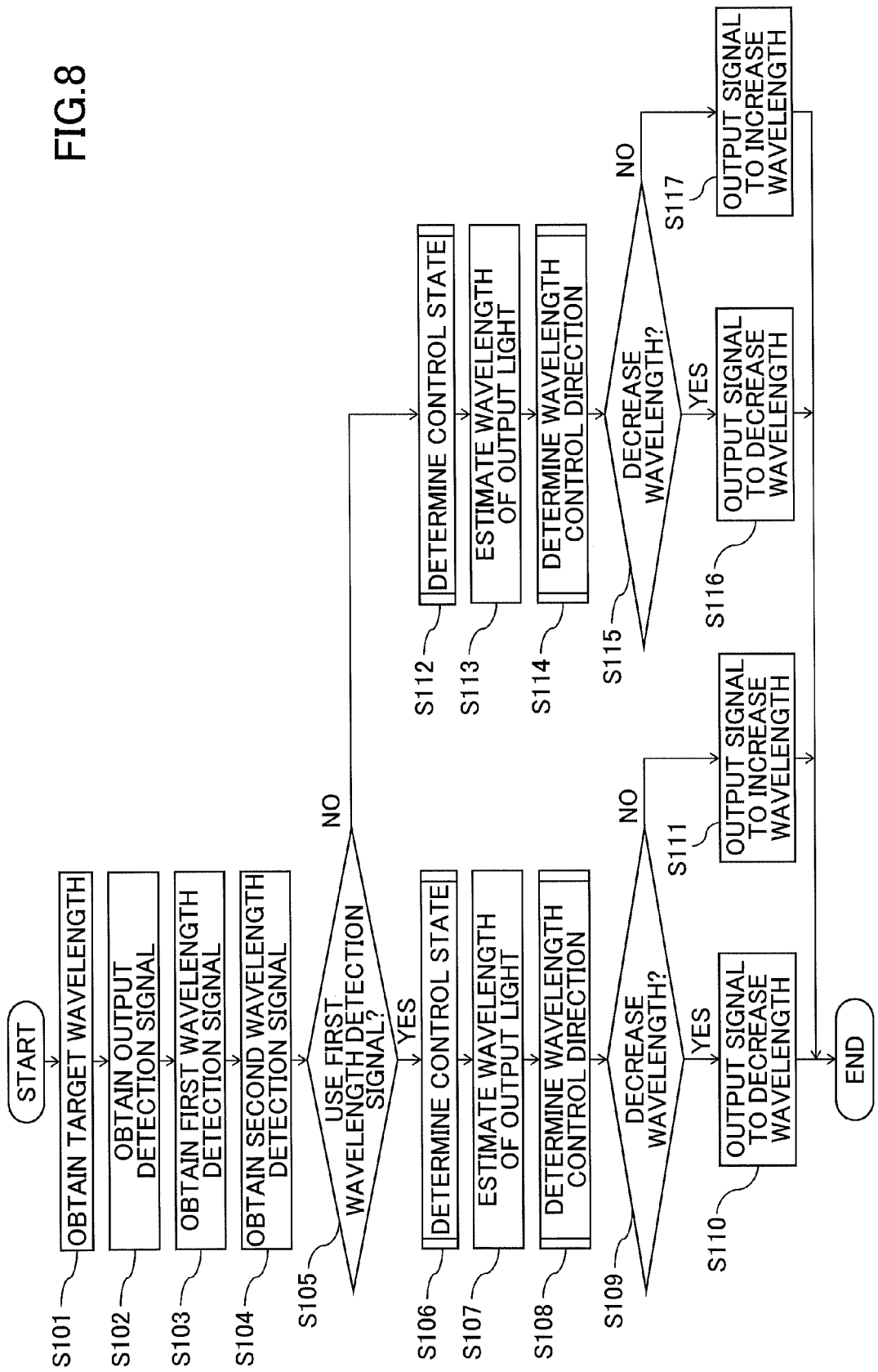

TUNABLE LIGHT SOURCE, OPTICAL MODULE, AND METHOD FOR CONTROLLING TUNABLE LIGHT SOURCE

CROSS-REFERENCE TO RELATED APPLICATION

This application is based upon and claims the benefit of priority of Japanese Patent Application No. 2017-151026 filed on Aug. 3, 2017, the entire contents of which are incorporated herein by reference.

FIELD

An aspect of this disclosure relates to a tunable light source, an optical module, and a method for controlling the tunable light source.

BACKGROUND

There are known methods for thermally controlling characteristics of optical devices by applying heat to the optical devices. For example, the resonant wavelength of a ring resonator can be controlled by heating the ring resonator. Also, the free spectral range (FSR) of a wavelength filter can be thermally controlled by heating the wavelength filter.

Further, there is a known technology where light output from a light-emitting device such as a laser diode disposed on a substrate is received by a light-receiving device via an optical waveguide and optical devices such as a ring oscillator and a wavelength filter whose characteristics are controlled by heating them with a heater (see, for example, US Patent Application Publication No. 2008/0193145 and US Patent Application Publication No. 2013/0094527).

However, when a ring oscillator and a wavelength filter are disposed on a single substrate and characteristics of both of the ring oscillator and the wavelength filter are thermally controlled, heat applied to the ring oscillator and heat applied to the wavelength filter interfere with each other, and desired characteristics may not be obtained.

SUMMARY

According to an aspect of this disclosure, there is provided a tunable light source that includes a substrate; a light source; a wavelength selecting device that selects, according to a control signal, output light with a specific wavelength from light output from the light source; a wavelength filter that is disposed on the substrate, filters the output light, and outputs the filtered light; a light-receiving device that receives the filtered light from the wavelength filter; and a controller configured to generate the control signal based on an output transmittance corresponding to a quantity of the received light received by the light-receiving device, a first transmittance corresponding to a target wavelength, a second transmittance corresponding to a shorter-wavelength limit of a control range including the target wavelength, and a third transmittance corresponding to a longer-wavelength limit of the control range, and output the generated control signal to the wavelength selecting device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram of a tunable light source according to a first embodiment.

FIG. 8 is a flowchart illustrating a wavelength control process performed by a wavelength controller in FIG. 4;

DESCRIPTION OF EMBODIMENTS

A tunable light source, an optical module, and a method for controlling the tunable light source according to embodiments are described below with reference to the accompanying drawings. However, the technical scope of the present invention is not limited to those embodiments.

Tunable Light Source of Related Art

Before describing a tunable light source, an optical module, and a method for controlling the tunable light source of embodiments, a tunable light source of the related art is described.

Figure 1A:
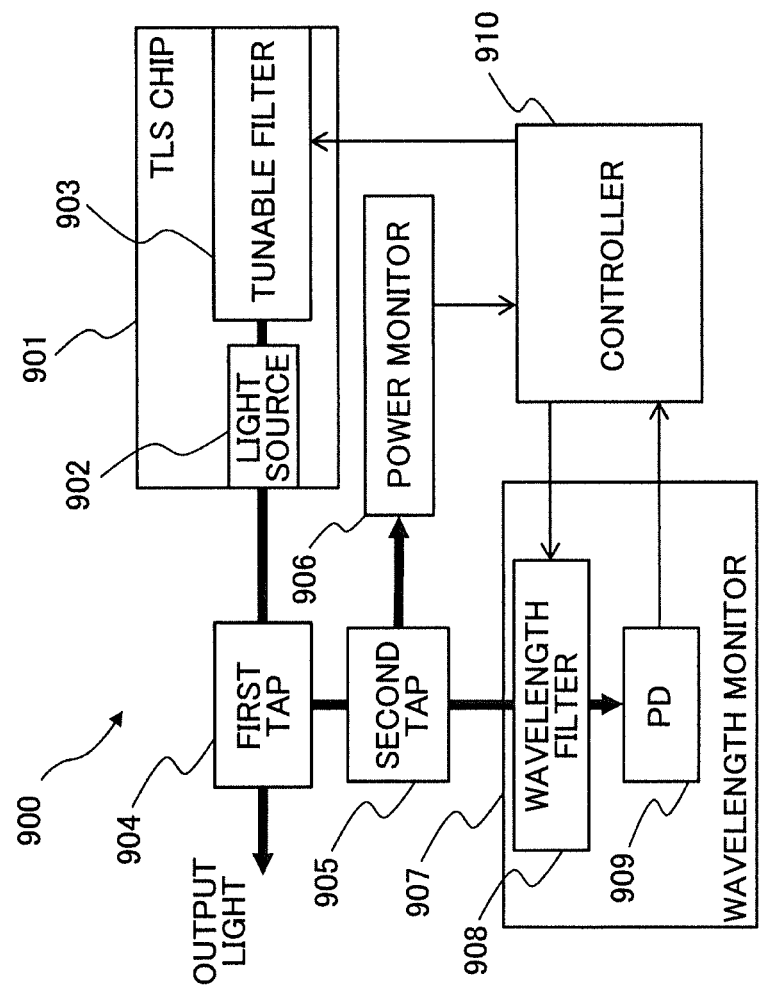
FIG. 1A is a drawing illustrating a tunable light source of the related art.
Figure 1B:
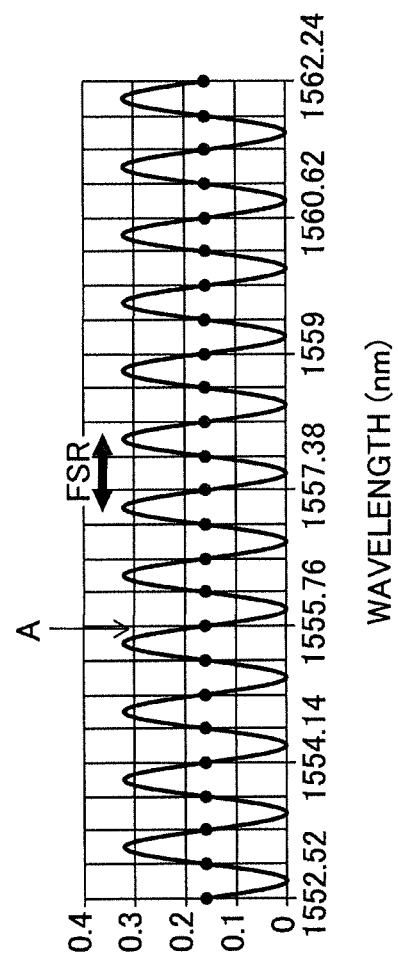
FIG. 1B is a graph illustrating a light transmission characteristic of a wavelength filter in FIG. 1A.

FIG. 1A is a drawing illustrating a tunable light source 900 of the related art, and FIG. 1B is a graph illustrating a light transmission characteristic of a wavelength filter 908 in FIG. 1A.

The tunable light source 900 includes a tunable laser source (TLS) chip 901 including a light source 902 and a tunable filter 903, a first tap 904, a second tap 905, a power monitor 906, a wavelength monitor 907, and a controller 910.

The TLS chip 901 is a semiconductor substrate such as a silicon substrate on which the light source 902 and the tunable filter 903 are mounted. The light source 902 is, for example, a semiconductor laser comprised of a semiconductor material such as GaAs/AlGaAs. The light source 902 may be, for example, a semiconductor optical amplifier (SOA) that emits natural light. The tunable filter 903 may also be referred to as a "ring resonator". The light source 902 and the tunable filter 903 form a resonator whose resonant frequency is controlled by a temperature applied to the tunable filter 903. That is, the resonant frequency of the resonator formed by the light source 902 and the tunable filter 903 is controlled by adjusting a temperature applied to the tunable filter 903. The temperature of the tunable filter 903 is adjusted, for example, by adjusting an electric current supplied to a heater such as a Peltier device disposed near the tunable filter 903. The tunable filter 903 functions as a wavelength selecting device that selects light (as output light) with a specific wavelength from light output from the light source 902 according to a wavelength control signal input from the controller 910. Because the configuration of a tunable filter is well known, further descriptions of the tunable filter 903 are omitted.

The first tap 904 is a splitter that splits light input from the TLS chip 901, and is configured such that the quantity of "output light" (which is output from the tunable light source 900) becomes greater than the quantity of light output to the second tap 905. For example, the first tap 904 is configured such that the quantity of output light becomes ten times greater than the quantity of light output to the second tap 905.

The second tap 905 is a splitter that splits light input from the first tap 904, and is configured such that the quantity of light output to the power monitor 906 becomes substantially the same as the quantity of light output to the wavelength monitor 907.

The power monitor 906 is, for example, a photodiode. The power monitor 906 receives light input via the second tap 905, and outputs an electric current corresponding to the quantity of the received light to the controller 910.

The wavelength monitor 907 includes a wavelength filter 908 and a monitoring device 909. The monitoring device 909 is, for example, a photodiode and outputs, to the controller 910, an electric current corresponding to the quantity of light input via the wavelength filter 908.

The wavelength filter 908 is, for example, an etalon filter having a free spectral range that is an integral multiple of a wavelength grid in a given standard. The light transmission characteristic of the wavelength filter 908 is shifted according to a temperature that is applied by a filter control signal input from the controller 910. The temperature of the wavelength filter 908 is adjusted, for example, by adjusting an electric current supplied to a heater such as a Peltier device disposed near the wavelength filter 908. The monitoring device 909 is, for example, a photodiode and outputs, to the controller 910, an electric current corresponding to the quantity of light input via the wavelength filter 908.

The controller 910 controls the light transmission characteristic of the tunable filter 903 based on the light transmission characteristic of the wavelength filter 908 that is calculated based on electric currents input from the power monitor 906 and the monitoring device 909.

Before controlling the light transmission characteristic of the tunable filter 903, the controller 910 adjusts the light transmission characteristic of the wavelength filter 908 such that the rate of change in optical transmittance in relation to variations in the wavelength of output light from the TLS chip 901 becomes high at a target wavelength. For example, when 1555.76 nm indicated by an arrow A in FIG. 1B is the target wavelength, the controller 910 adjusts the light transmission characteristic of the wavelength filter 908 such that the rate of change in optical transmittance in relation to variations in the wavelength of output light becomes high at the target wavelength of 1555.76 nm.

The controller 910 controls the light transmission characteristic of the tunable filter 903 by using the wavelength filter 908 that is adjusted such that the rate of change in optical transmittance in relation to variations in the wavelength of output light becomes high at the target wavelength.

Figure 2A:
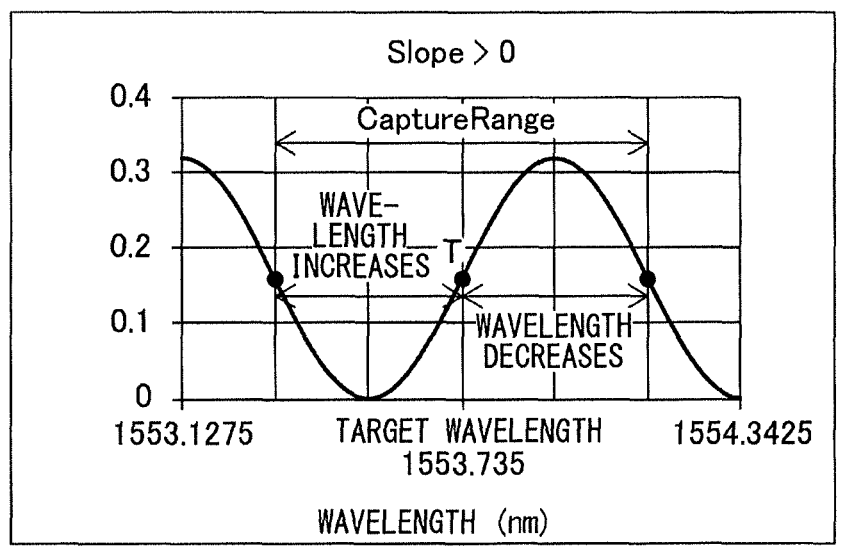
FIGS. 2A and 2B are graphs used to describe processes for controlling the light transmission characteristic of a tunable filter in FIG. 1A.
Figure 2B:
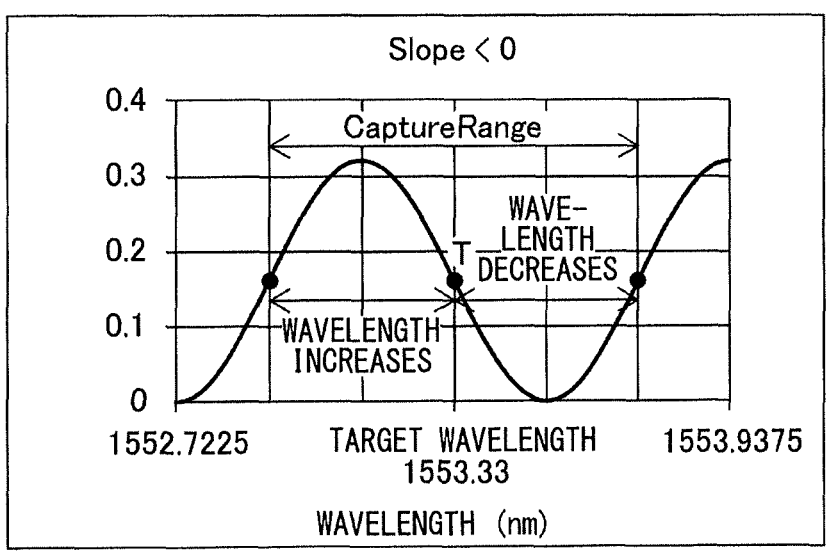

FIG. 2A is a graph used to describe a process performed by the controller 910 to control the light transmission characteristic of the tunable filter 903 when the wavelength filter 908 is set in a first state. FIG. 2B is a graph used to describe a process performed by the controller 910 to control the light transmission characteristic of the tunable filter 903 when the wavelength filter 908 is set in a second state. In FIGS. 2A and 2B, the horizontal axis indicates the wavelength of output light of the TLS chip 901, and the vertical axis indicates the optical transmittance of the wavelength filter 908 which is indicated by a ratio of an electric current input from the monitoring device 909 to an electric current input from the power monitor 906.

Also, in FIGS. 2A and 2B, a bidirectional arrow "CaptureRange" indicates a control range centered at a target wavelength T.

In the first state illustrated by FIG. 2A, in the control range centered at the target wavelength T of 1553.735 nm, the optical transmittance of the wavelength filter 908 monotonically increases as the wavelength of the output light of the TLS chip 901 increases. In the first state illustrated by FIG. 2A, when the optical transmittance of the wavelength filter 908 is greater than the optical transmittance corresponding to the target wavelength T, it indicates that the wavelength of the output light of the TLS chip 901 is longer than the target wavelength T. On the other hand, when the optical transmittance of the wavelength filter 908 is less than the optical transmittance corresponding to the target wavelength T, it indicates that the wavelength of the output light of the TLS chip 901 is shorter than the target wavelength T.

In the first state illustrated by FIG. 2A, when the optical transmittance of the wavelength filter 908 is greater than the optical transmittance corresponding to the target wavelength T, the controller 910 outputs, to the tunable filter 903, a control signal to decrease the wavelength of the output light. On the other hand, when the optical transmittance of the wavelength filter 908 is less than the optical transmittance corresponding to the target wavelength T, the controller 910 outputs, to the tunable filter 903, a control signal to increase the wavelength of the output light.

In the second state illustrated by FIG. 2B, in the control range centered at the target wavelength T of 1553.33 nm, the optical transmittance of the wavelength filter 908 monotonically decreases as the wavelength of the output light of the TLS chip 901 increases. In the second state illustrated by FIG. 2B, when the optical transmittance of the wavelength filter 908 is greater than the optical transmittance corresponding to the target wavelength T, it indicates that the wavelength of the output light of the TLS chip 901 is shorter than the target wavelength T. On the other hand, when the optical transmittance of the wavelength filter 908 is less than the optical transmittance corresponding to the target wavelength T, it indicates that the wavelength of the output light of the TLS chip 901 is longer than the target wavelength T.

In the second state illustrated by FIG. 2B, when the optical transmittance of the wavelength filter 908 is greater than the optical transmittance corresponding to the target wavelength T, the controller 910 outputs, to the tunable filter 903, a control signal to increase the wavelength of the output light. On the other hand, when the optical transmittance of the wavelength filter 908 is less than the optical transmittance corresponding to the target wavelength T, the controller 910 outputs, to the tunable filter 903, a control signal to decrease the wavelength of the output light.

In the tunable light source 900, the controller 910 can control the wavelength of the output light of the TLS chip 901 with a simple method by controlling the tunable filter 903 according to the light transmission characteristics of the wavelength filter 908 in two different states, i.e., the first state and the second state.

However, with the configuration of the tunable light source 900, because the TLS chip 901 and the wavelength monitor 907 are formed as separate devices, the size of a module including the tunable light source 900 becomes large, and costs related to the assembly work including the adjustment of optical axes of devices may increase.

Figure 3A:
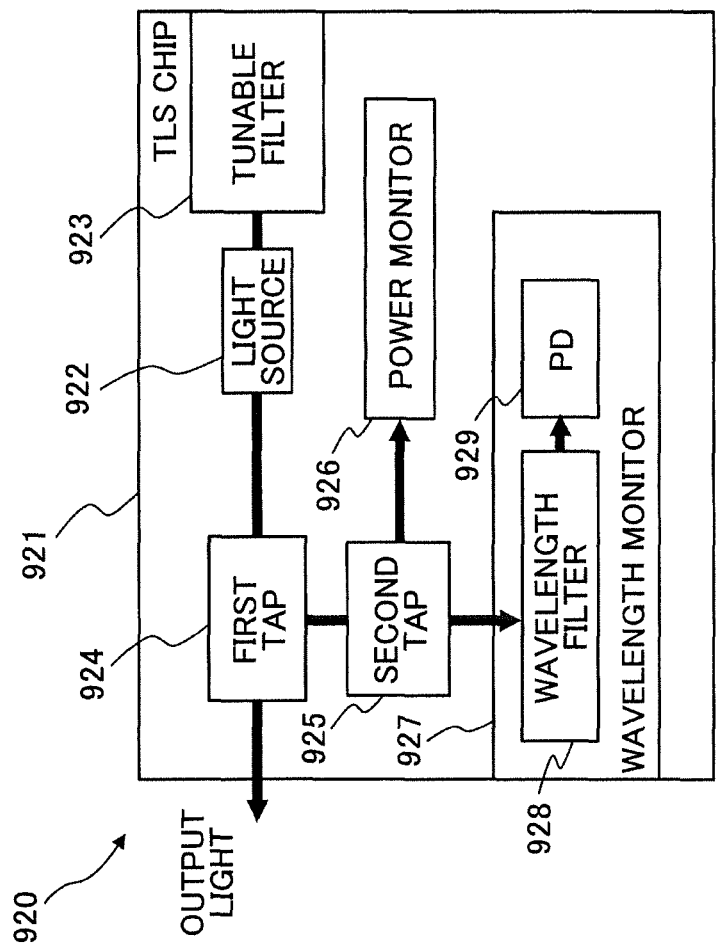
FIG. 3A is a drawing illustrating another tunable light source of the related art.
Figure 3B:
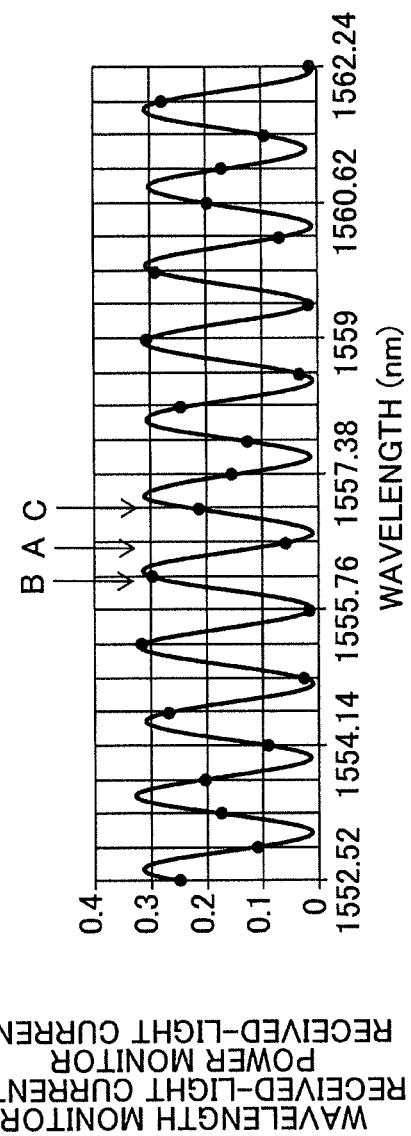
FIG. 3B is a graph illustrating a light transmission characteristic of a wavelength filter in FIG. 3A.

FIG. 3A is a drawing illustrating a tunable light source 920 of the related art, and FIG. 3B is a graph illustrating a light transmission characteristic of a wavelength filter 928 in FIG. 3A.

The tunable light source 920 includes a light source 922, a tunable filter 923, a first tap 924, a second tap 925, a power monitor 926, and a wavelength monitor 927. The light source 922, the tunable filter 923, the first tap 924, the second tap 925, the power monitor 926, and the wavelength monitor 927 are disposed on a TLS chip 921. Also, the light source 922, the tunable filter 923, the first tap 924, the second tap 925, the power monitor 926, and the wavelength monitor 927 are connected to each other via optical waveguides formed on the TLS chip 921.

Except that the light source 922, the tunable filter 923, the first tap 924, the second tap 925, and the power monitor 926 are disposed on the TLS chip 921, their configurations and functions are substantially the same as those of the light source 902, the tunable filter 903, the first tap 904, the second tap 905, and the power monitor 906, and therefore detailed descriptions of those components are omitted here.

The wavelength monitor 927 includes a wavelength filter 928 and a monitoring device 929. Except that the monitoring device 929 is disposed on the TLS chip 921, the configuration and function of the monitoring device 929 are substantially the same as those of the monitoring device 909, and therefore detailed descriptions of the monitoring device 929 are omitted here.

The wavelength filter 908 is an optical filter implemented by an optical waveguide. For example, the wavelength filter 908 may be a delay-line interferometer filter.

In the tunable light source 920, the light source 922, the tunable filter 923, the first tap 924, the second tap 925, the power monitor 926, and the wavelength monitor 927 are disposed on the same TLS chip 921. This configuration makes it possible to reduce the size of a module including the tunable light source 920 and reduce the costs related to the assembly work.

However, in the tunable light source 920, both of the tunable filter 923 and the wavelength monitor 927 are disposed on the same TLS chip 921. With this configuration, if the characteristics of both of the tunable filter 923 and the wavelength monitor 927 are thermally controlled, heat applied to the tunable filter 923 and heat applied to the wavelength monitor 927 interfere with each other, and desired characteristics may not be obtained. Therefore, the wavelength monitor 927 is not thermally controlled. In the tunable light source 920, because the wavelength monitor 927 is not thermally controlled, the light transmission characteristic of the wavelength monitor 927 cannot be shifted.

Also, because the wavelength monitor 927 is implemented by an optical waveguide whose refractive index depends on the wavelength of input light, the FSR of the wavelength monitor 927 changes according to the wavelength of input light and unlike the wavelength monitor 907, it is difficult to make the FSR of the wavelength monitor 927 constant. In other words, because the FSR of the wavelength monitor 927 changes according to the wavelength of input light, it is difficult to set the FSR at an integral multiple of a wavelength grid.

For the above reasons, as illustrated in FIG. 3B, the optical transmittance of the wavelength monitor 927 corresponding to a target wavelength T (indicated by an arrow A) does not match the optical transmittances of the wavelength monitor 927 corresponding to wavelengths (indicated by arrows B and C) defining the limits of a control range centered at the target wavelength T.

Tunable Light Source of Embodiment

In a tunable light source of an embodiment, the wavelength of output light is controlled based on a result of comparing an optical transmittance of light filtered by a wavelength filter and optical transmittances of the wavelength filter corresponding to a target wavelength and wavelengths defining the limits of a control range. In a tunable light source of an embodiment, the wavelength of output light is controlled in different manners depending on optical transmittances corresponding to a target wavelength of the output light and wavelengths defining the limits of a control range, without controlling the light transmission characteristic of a wavelength filter.

Configuration and Functions of Tunable Light Source of First Embodiment

Figure 5:
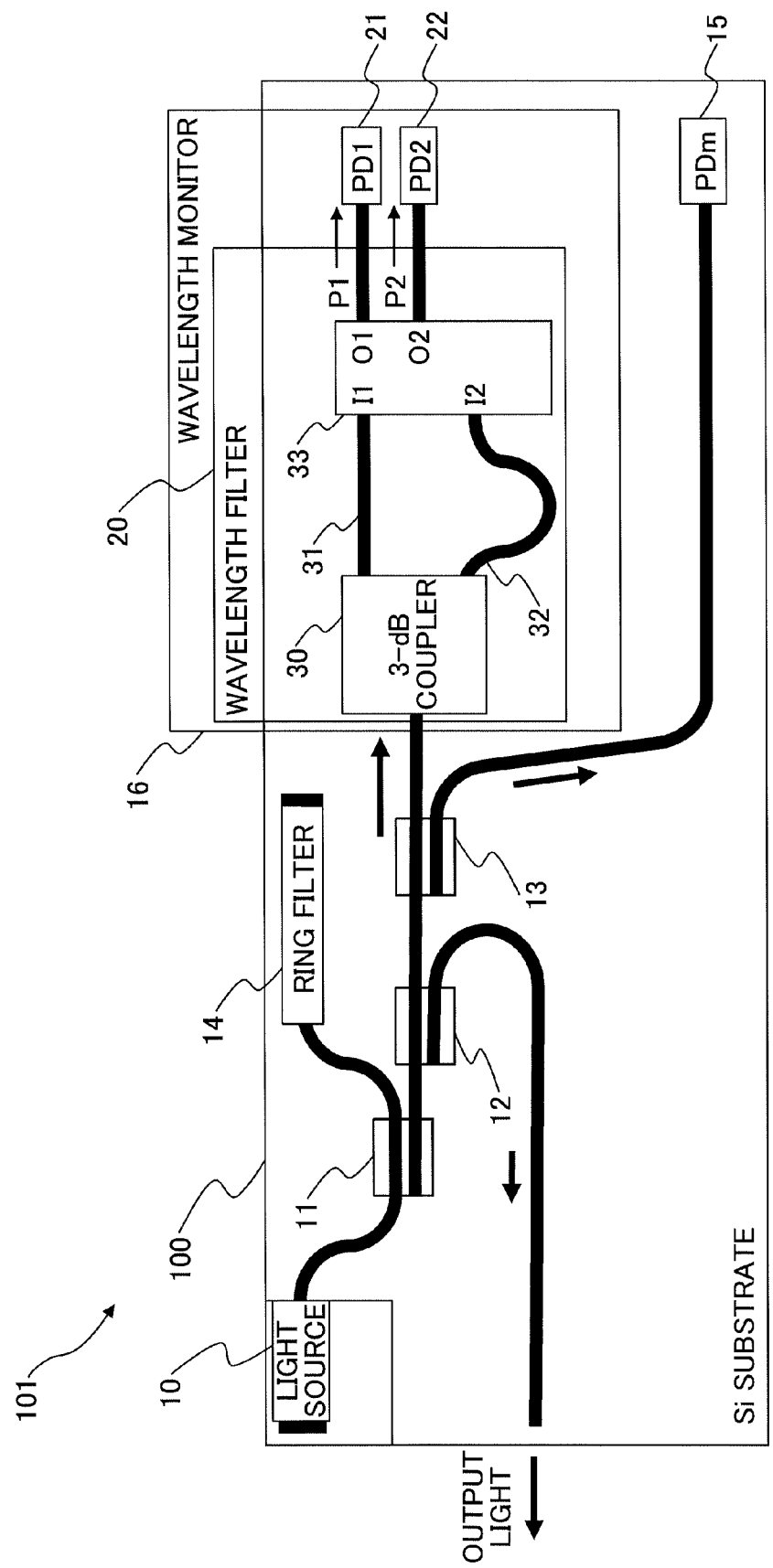
FIG. 5 is a block diagram of an optical unit in FIG. 4.

FIG. 4 is a block diagram of a tunable light source 1 according to a first embodiment, and FIG. 5 is a block diagram of an optical unit 101 in FIG. 4.

The tunable light source 1 includes the optical unit 101 and a controller 5. The optical unit 101 includes a substrate 100, and a light source 10, a first tap 11, a second tap 12, a third tap 13, a ring filter 14, a power monitor 15, and a wavelength monitor 16 that are disposed on the substrate 100. The wavelength monitor 16 includes a wavelength filter 20, a first monitoring device 21, and a second monitoring device 22.

The first tap 11 is configured such that the quantity of light output to the ring filter 14 becomes greater than the quantity of light output to the second tap 12. For example, the first tap 11 is configured such that the quantity of light output to the ring filter 14 becomes ten times greater than the quantity of light output to the second tap 12.

The second tap 12 is configured such that the quantity of "output light" (which is output from the tunable light source 1) becomes greater than the quantity of light output to the third tap 13. For example, the second tap 12 is configured such that the quantity of the output light becomes ten times greater than the quantity of light output to the third tap 13.

The third tap 13 is configured such that the quantity of light output to the wavelength monitor 16 becomes greater than the quantity of light output to the power monitor 15. For example, the third tap 13 is configured such that the quantity of light output to the wavelength monitor 16 becomes two times greater than the quantity of light output to the power monitor 15. Accordingly, the quantities of light output to the first monitoring device 21, the second monitoring device 22, and the power monitor 15 become substantially the same.

The ring filter 14 may also be referred to as a "ring resonator". The ring filter 14 and the light source 10 form a resonator whose resonant frequency is controlled by an applied temperature. That is, the resonant frequency of the resonator formed by the light source 10 and the ring filter 14 is controlled by adjusting a temperature applied to the ring filter 14. The temperature of the ring filter 14 is adjusted, for example, by adjusting an electric current supplied to a heater such as a Peltier device disposed near the ring filter 14. The ring filter 14 functions as a wavelength selecting device that selects, as output light, light with a specific wavelength from light output from the light source 10 according to a wavelength control signal input from the controller 5. Because the configuration of a ring filter is well known, detailed descriptions of the ring filter 14 are omitted here.

The power monitor 15 is, for example, a photodiode. The power monitor 15 receives light input via the third tap 13, and outputs an electric current corresponding to the quantity of the received light to the controller 5.

The wavelength monitor 16 includes the wavelength filter 20, the first monitoring device 21, and the second monitoring device 22. The first monitoring device 21 and the second monitoring device 22 are examples of light-receiving devices such as photodiodes. Each of the first monitoring device 21 and the second monitoring device 22 outputs, to the controller 5, an electric current corresponding to the quantity of light input via the wavelength filter 20.

The wavelength filter 20 includes a splitter 30, a first waveguide 31, a second waveguide 32, and a 90° hybrid 33. The wavelength filter 20 includes two output ports corresponding to two filtering paths through which output light passes.

The splitter 30 is, for example, a 3-dB coupler and splits light output from the third tap 13. The splitter 30 is configured such that the quantity of light output to the first waveguide 31 becomes the same as the quantity of light output to the second waveguide 32.

The first waveguide 31 is disposed between the splitter 30 and the 90° hybrid 33, and a portion of light split by the splitter 30 passes through the first waveguide 31. The second waveguide 32 is longer than the first waveguide 31 and disposed between the splitter 30 and the 90° hybrid 33. Another portion of light split by the splitter 30 passes through the second waveguide 32.

The 90° hybrid 33 is an optical splitter using a multi-mode interference (MMI) waveguide that includes two input ports and two output ports and is also referred to as "2×2 MMI". The 90° hybrid 33 is configured such that the maximum quantities of first light P1 and second light P2 output from a first output port O1 and a second output port O2 become equal to each other, and the phases of the first light P1 and the second light P2 are shifted by 90° from each other.

The 90° hybrid 33 combines light input to a first input port I1 via the first waveguide 31 and light input to a second input port I2 via the second waveguide 32, and outputs the combined light from each of the first output port O1 and the second output port O2. Because the configuration of a 2×2 MMI is well known, detailed descriptions of the 90° hybrid 33 are omitted here.

The wavelength filter 20 functions as a delay-line interferometer filter. The transmittance of light output from each of the first output port O1 and the second output port O2 changes depending on the wavelength.

Figure 6:
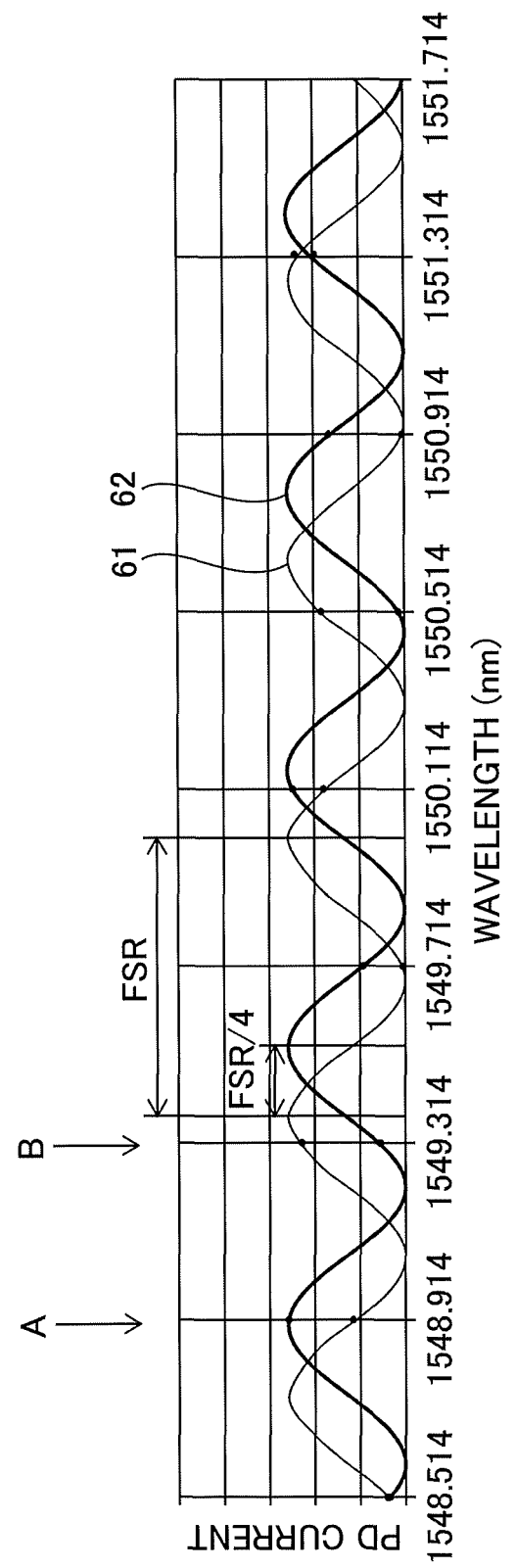
FIG. 6 is a graph illustrating a light transmission characteristic of a wavelength filter in FIG. 5.

FIG. 6 is a graph illustrating a light transmission characteristic of the wavelength filter 20. In FIG. 6, the horizontal axis indicates the wavelength of light input to the wavelength filter 20, and the vertical axis indicates the optical transmittance of output light output from each of the first output port O1 and the second output port O2. A waveform 61 indicates the optical transmittance of the first light P1 output from the first output port O1, and a waveform 62 indicates the optical transmittance of the second light P2 output from the second output port O2. The optical transmittance of light output from each of the first output port O1 and the second output port O2 is indicated by a ratio of the quantity of light output from each of the first output port O1 and the second output port O2 to the total quantity of light output from the first output port O1 and the second output port O2.

In FIG. 6, near a wavelength of 1548.914 nm indicated by an arrow A, the slope of the waveform 61 corresponding to the first light P1 becomes maximum, and the slope of the waveform 62 corresponding to the second light P2 becomes minimum. That is, near the wavelength of 1548.914 nm, the rate of change in the optical transmittance of the first light P1 in relation to variations in the wavelength becomes maximum.

Also in FIG. 6, near a wavelength of 1549.314 nm indicated by an arrow B, the slope of the waveform 61 corresponding to the first light P1 becomes minimum, and the slope of the waveform 62 corresponding to the second light P2 becomes maximum. That is, near the wavelength of 1549.314 nm, the rate of change in the optical transmittance of the second light P2 in relation to variations in the wavelength becomes maximum.

When the wavelength of output light is controlled by adjusting the temperature applied to the ring filter 14 based on the rate of change in optical transmittance in relation to variations in the wavelength, the accuracy of controlling the wavelength of output light increases as the rate of change in optical transmittance in relation to variations in the wavelength increases. Near the wavelength of 1548.914 nm indicated by the arrow A in FIG. 6, the controller 5 adjusts the temperature applied to the ring filter 14 according to an electric current input from the first monitoring device 21 that receives the first light P1 whose change rate in optical transmittance in relation to variations in the wavelength is maximum. On the other hand, near the wavelength of 1549.314 nm indicated by the arrow B in FIG. 6, the controller 5 adjusts the temperature applied to the ring filter 14 according to an electric current input from the second monitoring device 22 that receives the second light P2 whose change rate in optical transmittance in relation to variations in the wavelength is maximum. It is possible to accurately control the wavelength of output light by adjusting the temperature applied to the ring filter 14 based on an electric current input from a monitoring device that receives light whose change rate in optical transmittance in relation to variations in the wavelength is maximum.

The controller 5 may be implemented by a hardware processor and a memory storing a program that is executed by the processor to perform various processes. For example, the controller 5 is comprised of a logic circuit implemented by a CMOS transistor formed on a substrate and a storage circuit implemented by a flash memory. The controller 5 includes a wavelength controller 501 and an output controller 502 that are implemented by logic circuits and a storage 503 that is implemented by a volatile memory and a nonvolatile memory.

Figure 7:
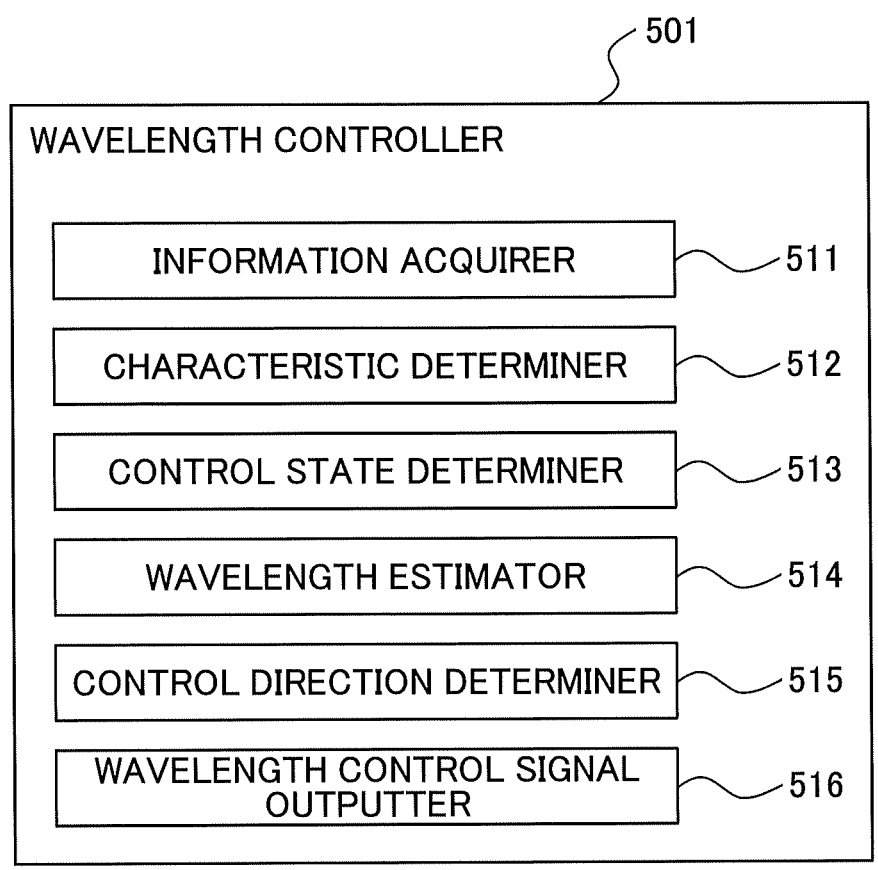
FIG. 7 is a functional block diagram of a wavelength controller in FIG. 4.

FIG. 7 is a functional block diagram of the wavelength controller 501.

The wavelength controller 501 includes an information acquirer 511, a characteristic determiner 512, a control state determiner 513, a wavelength estimator 514, a control direction determiner 515, and a wavelength control signal outputter 516.

FIG. 8 is a flowchart illustrating a wavelength control process performed by the wavelength controller 501. The wavelength control process of FIG. 8 is executed by a logic circuit implementing the wavelength controller 501.

The information acquirer 511 obtains a target wavelength of output light of the tunable light source 1 (S101). The target wavelength is stored in the storage 503, and the information acquirer 511 obtains the target wavelength from the storage 503.

The information acquirer 511 obtains, from the optical unit 101, an output detection signal indicating an electric current supplied from the power monitor 15 according to the quantity of the output light (S102). Next, the information acquirer 511 obtains, from the optical unit 101, a first wavelength detection signal indicating an electric current supplied from the first monitoring device 21 according to the quantity of the first light P1 (S103). Next, the information acquirer 511 obtains, from the optical unit 101, a second wavelength detection signal indicating an electric current supplied from the second monitoring device 22 according to the quantity of the second light P2 (S104).

Then, the characteristic determiner 512 selects one of the electric current corresponding to the first wavelength detection signal and the electric current corresponding to the second wavelength detection signal to be used for the wavelength control process (S105). The characteristic determiner 512 selects one of the electric current corresponding to the first wavelength detection signal and the electric current corresponding to the second wavelength detection signal to be used for the wavelength control process by referring to a filter characteristic table 532 stored in the storage 503 based on the target wavelength obtained at step S101. For example, the filter characteristic table 532 stores a relationship between wavelengths and optical transmittances of the wavelength monitor 16 at a predetermined temperature as exemplified by FIG. 6. The filter characteristic table 532 may include multiple tables corresponding to temperatures applied to the ring filter 14. For example, when the target wavelength is 1548.914 nm indicated by the arrow A in FIG. 6, the characteristic determiner 512 determines to use the electric current corresponding to the first wavelength detection signal input from the first monitoring device 21 for the wavelength control process. Also, when the target wavelength is 1549.314 nm indicated by the arrow B in FIG. 6, the characteristic determiner 512 determines to use the electric current corresponding to the second wavelength detection signal input from the second monitoring device 22 for the wavelength control process.

When the characteristic determiner 512 determines to use the electric current corresponding to the first wavelength detection signal for the wavelength control process (YES at S105), the process proceeds to step S106. The control state determiner 513 determines a control state of the wavelength filter 20 based on a first transmittance corresponding to the target wavelength, a second transmittance corresponding to a shorter-wavelength limit of a predetermined control range including the target wavelength, and a third transmittance corresponding to a longer-wavelength limit of the control range (S106). Specifically, the control state determiner 513 determines one of first through sixth states as the control state of the wavelength filter 20.

FIGS. 9A through 9F are graphs illustrating examples of first through sixth states (S1-S6). In each of FIGS. 9A through 9F, the control range is indicated by a bidirectional arrow "CaptureRange".

In the first state S1, the target wavelength T is 1553.32 nm, and the first transmittance corresponding to the target wavelength T is 0.17. Also, the wavelength at a shorter-wavelength limit S of the control range is 1552.92 nm, and the second transmittance corresponding to the shorter-wavelength limit S is 0.11. Also, the wavelength at a longer-wavelength limit L of the control range is 1553.72 nm, and the third transmittance corresponding to the longer-wavelength limit L is 0.20. In the first state S1, the third transmittance is highest, the second transmittance is lowest, and the first transmittance is between the second transmittance and the third transmittance.

In the second state S2, the target wavelength T is 1560.60 nm, and the first transmittance corresponding to the target wavelength T is 0.19. Also, the wavelength at the shorter-wavelength limit S of the control range is 1560.20 nm, and the second transmittance corresponding to the shorter-wavelength limit S is 0.06. Also, the wavelength at the longer-wavelength limit L of the control range is 1561.00 nm, and the third transmittance corresponding to the longer-wavelength limit L is 0.17. In the second state S2, the first transmittance is highest, the second transmittance is lowest, and the third transmittance is between the first transmittance and the second transmittance.

In the third state S3, the target wavelength T is 1561.42 nm, and the first transmittance corresponding to the target wavelength T is 0.09. Also, the wavelength at the shorter-wavelength limit S of the control range is 1561.02 nm, and the second transmittance corresponding to the shorter-wavelength limit S is 0.17. Also, the wavelength at the longer-wavelength limit L of the control range is 1561.82 nm, and the third transmittance corresponding to the longer-wavelength limit L is 0.28.

In the third state S3, the third transmittance is highest, the first transmittance is lowest, and the second transmittance is between the first transmittance and the third transmittance. The third state S3 corresponds to a state that is obtained by vertically and horizontally inverting the second state S2.

In the fourth state S4, the target wavelength T is 1561.82 nm, and the first transmittance corresponding to the target wavelength T is 0.28. Also, the wavelength at the shorter-wavelength limit S of the control range is 1561.42 nm, and the second transmittance corresponding to the shorter-wavelength limit S is 0.09. Also, the wavelength at the longer-wavelength limit L of the control range is 1562.22 nm, and the third transmittance corresponding to the longer-wavelength limit L is 0.02. In the fourth state S4, the first transmittance is highest, the third transmittance is lowest, and the second transmittance is between the first transmittance and the third transmittance. The fourth state S4 corresponds to a state that is obtained by vertically inverting the third state S3.

In the fifth state S5, the target wavelength T is 1560.20 nm, and the first transmittance corresponding to the target wavelength T is 0.07. Also, the wavelength at the shorter-wavelength limit S of the control range is 1559.80 nm, and the second transmittance corresponding to the shorter-wavelength limit S is 0.29. Also, the wavelength at the longer-wavelength limit L of the control range is 1560.60 nm, and the third transmittance corresponding to the longer-wavelength limit L is 0.19. In the fifth state S5, the second transmittance is highest, the first transmittance is the lowest, and the third transmittance is between the first transmittance and the second transmittance. The fifth state S5 corresponds to a state that is obtained by vertically inverting the second state S2.

In the sixth state S6, the target wavelength T is 1561.00 nm, and the first transmittance corresponding to the target wavelength T is 0.17. Also, the wavelength at the shorter-wavelength limit S of the control range is 1560.60 nm, and the second transmittance corresponding to the shorter-wavelength limit S is 0.19. Also, the wavelength at the longer-wavelength limit L of the control range is 1561.40 nm, and the third transmittance corresponding to the longer-wavelength limit L is 0.09. In the sixth state S6, the second transmittance is highest, the third transmittance is the lowest, and the first transmittance is between the second transmittance and the third transmittance. The sixth state S6 corresponds to a state that is obtained by vertically inverting the first state S1.

Figure 10:
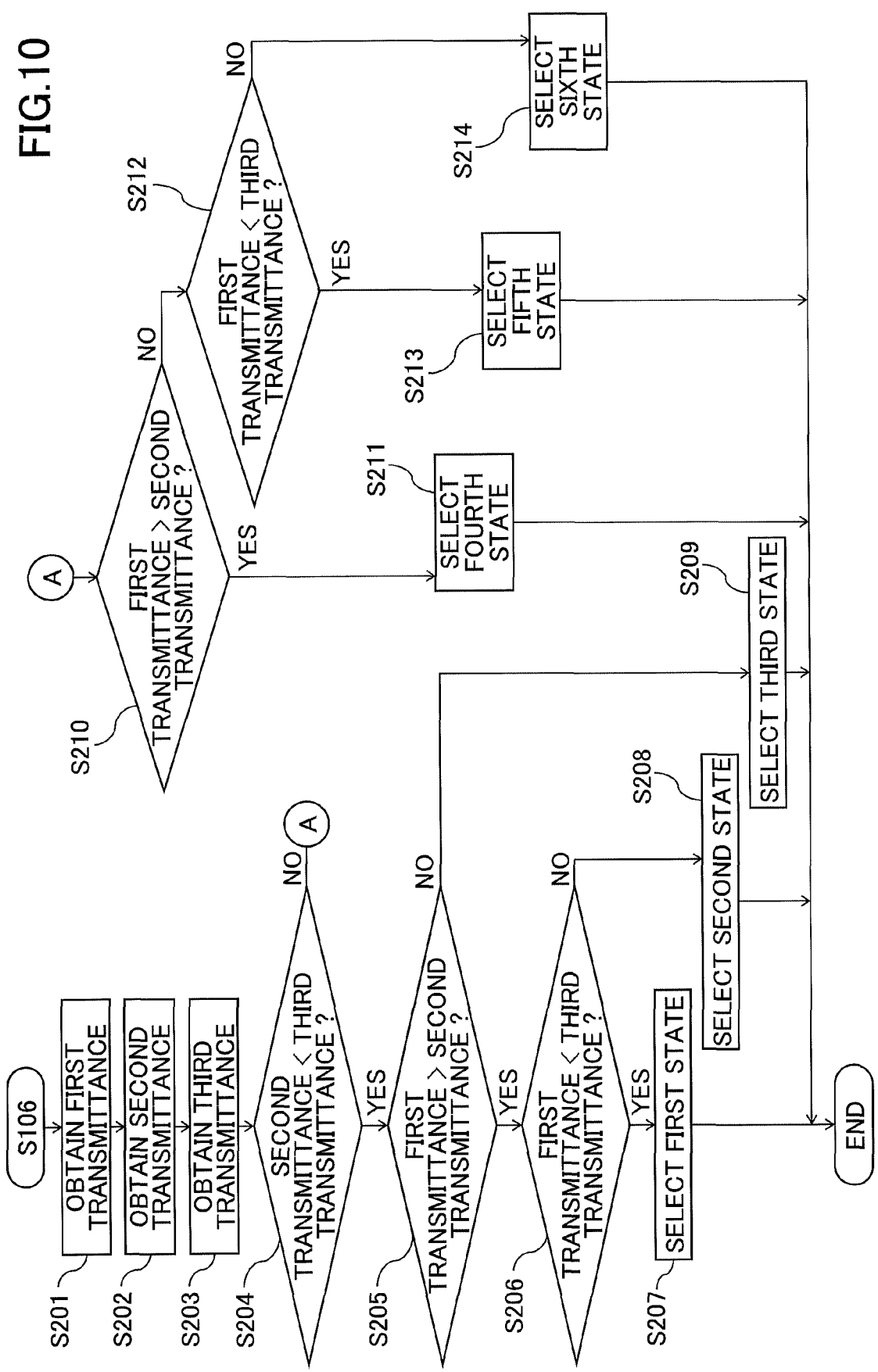
FIG. 10 is a flowchart illustrating details of step S106 in FIG. 8.

FIG. 10 is a flowchart illustrating details of step S106 in FIG. 8.

The control state determiner 513 obtains the first transmittance corresponding to the target wavelength T by referring to the filter characteristic table 532 (S201). Next, the control state determiner 513 obtains the second transmittance corresponding to the shorter-wavelength limit S of a control range including the target wavelength T by referring to the filter characteristic table 532 (S202). Next, the control state determiner 513 obtains the third transmittance corresponding to the longer-wavelength limit L of the control range including the target wavelength T by referring to the filter characteristic table 532 (S203). For example, the control range is centered at the target wavelength T and has the same width on the shorter-wavelength side and the longer-wavelength side of the target wavelength T.

Next, the control state determiner 513 determines whether the second transmittance is lower than the third transmittance (S204). If the second transmittance is lower than the third transmittance (YES at S204), the control state determiner 513 determines whether the first transmittance is higher than the second transmittance (S205). If the first transmittance is higher than the second transmittance (YES at S205), the control state determiner 513 determines whether the first transmittance is lower than the third transmittance (S206). If the first transmittance is lower than the third transmittance (YES at S206), the control state determiner 513 determines the first state S1 as the control state of the wavelength filter 20 (S207). If the first transmittance is higher than the third transmittance (NO at S206), the control state determiner 513 determines the second state S2 as the control state of the wavelength filter 20 (S208). If the first transmittance is lower than the second transmittance (NO at S205), the control state determiner 513 determines the third state S3 as the control state of the wavelength filter 20 (S209).

If the second transmittance is higher than the third transmittance (NO at S204), the control state determiner 513 determines whether the first transmittance is higher than the second transmittance (S210). If the first transmittance is higher than the second transmittance (YES at S210), the control state determiner 513 determines the fourth state S4 as the control state of the wavelength filter 20 (S211). If the first transmittance is lower than the second transmittance (NO at step S210), the control state determiner 513 determines whether the first transmittance is lower than the third transmittance (S212). If the first transmittance is lower than the third transmittance (YES at S212), the control state determiner 513 determines the fifth state S5 as the control state of the wavelength filter 20 (S213). If the first transmittance is higher than the third transmittance (NO at S212), the control state determiner 513 determines the sixth state S6 as the control state of the wavelength filter 20 (S214).

When the control state of the wavelength filter 20 is determined (S106), the wavelength estimator 514 estimates the wavelength of output light output from the optical unit 101 by using an electric current corresponding to the first wavelength detection signal (S107). Specifically, the wavelength estimator 514 estimates the wavelength of output light output from the optical unit 101 based on a ratio of the electric current corresponding to the first wavelength detection signal obtained at step S103 to the electric current corresponding to the output detection signal obtained at step S102. For example, the wavelength estimator 514 estimates the wavelength of the output light by comparing the ratio of the electric current obtained at step S103 to the electric current obtained at step S102 with a table stored in the storage 503 and indicating a relationship between electric current ratios and wavelengths.

Next, the control direction determiner 515 refers to the filter characteristic table 532 to determine whether to decrease or increase the wavelength of the output light of the tunable light source 1 (S108).

Figure 11:
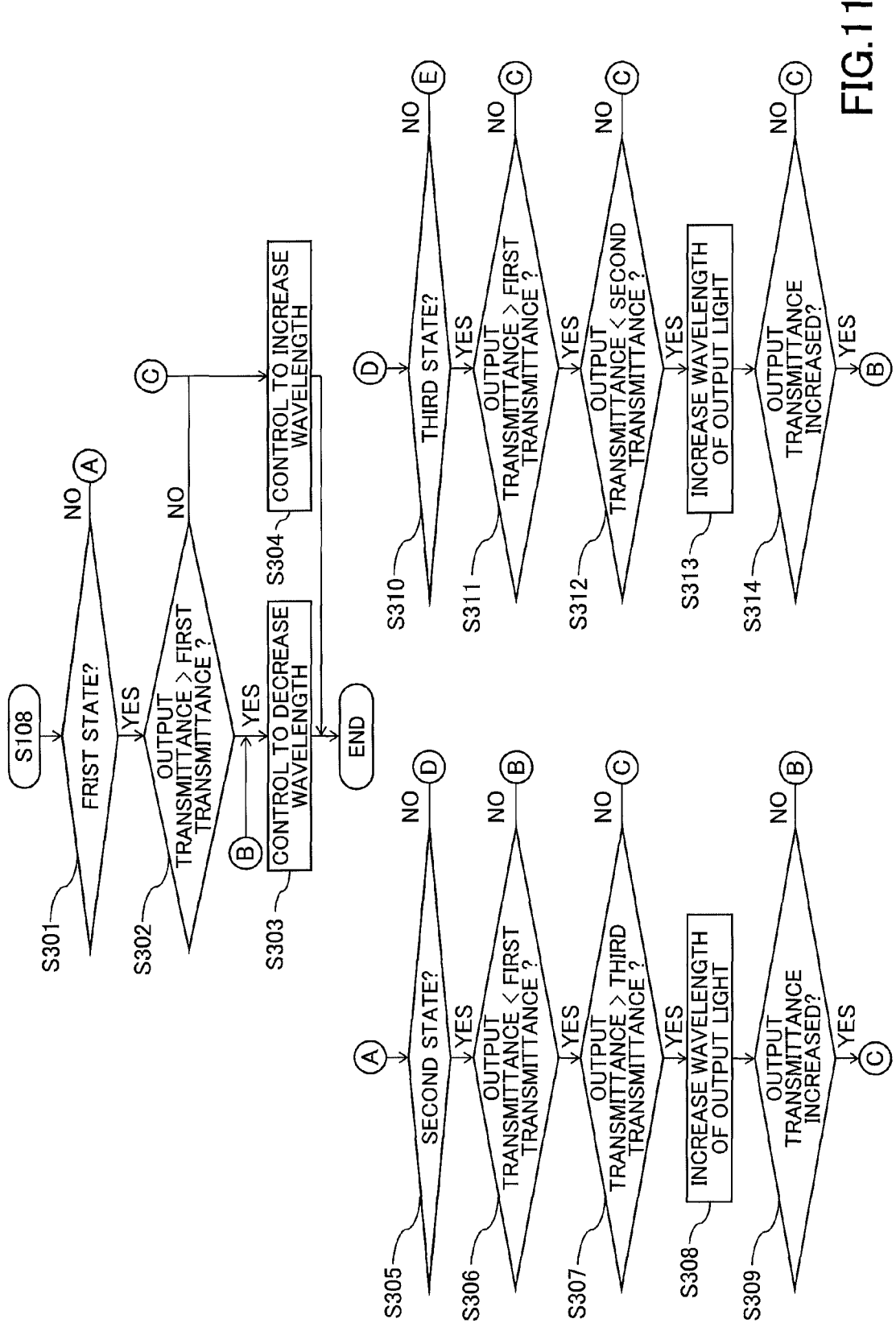
FIG. 11 is a flowchart illustrating details of step S108 in FIG. 8.
Figure 12:
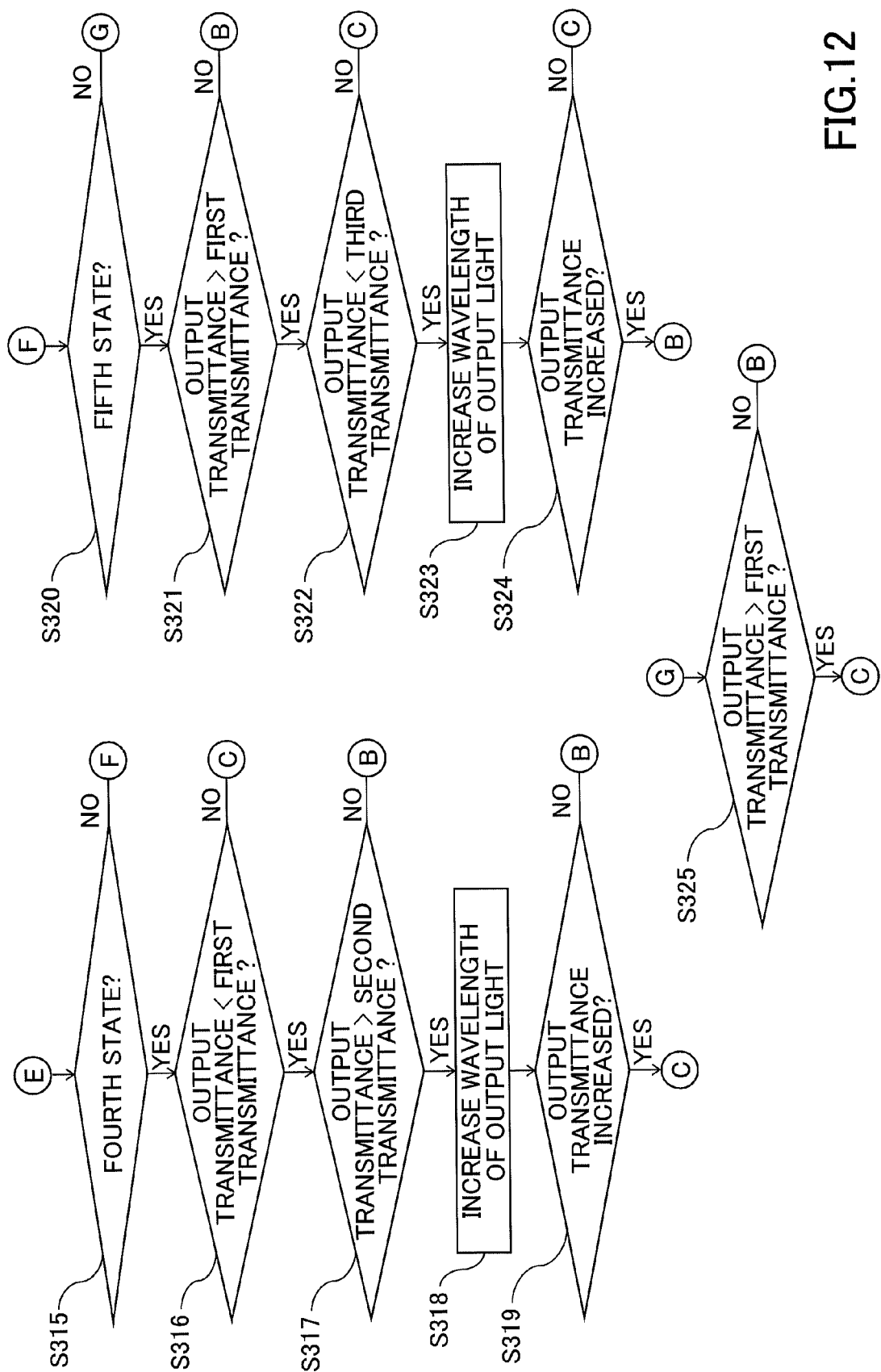
FIG. 12 is a flowchart illustrating details of step S108 in FIG. 8.

FIGS. 11 and 12 are flowcharts illustrating details of step S108 in FIG. 8.

First, the control direction determiner 515 determines whether the control state of the wavelength filter 20 is the first state S1 (S301). If the control state of the wavelength filter 20 is the first state S1 (YES at S301), the control direction determiner 515 determines whether an output transmittance corresponding to the wavelength of the output light estimated at step S107 is higher than the first transmittance corresponding to the target wavelength T (S302). If the output transmittance is higher than the first transmittance corresponding to the target wavelength T (YES at S302), the control direction determiner 515 determines to decrease the wavelength of the output light of the tunable light source 1 (S303). If the output transmittance is lower than the first transmittance corresponding to the target wavelength T (NO at S302), the control direction determiner 515 determines to increase the wavelength of the output light of the tunable light source 1 (S304).

Figure 9B:
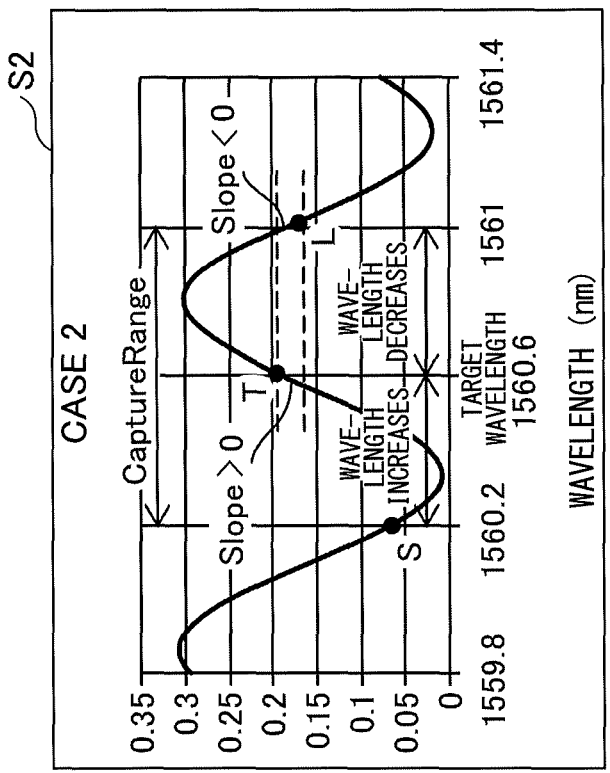
FIGS. 9A through 9F are graphs illustrating examples of first through sixth states.
Figure 9A:
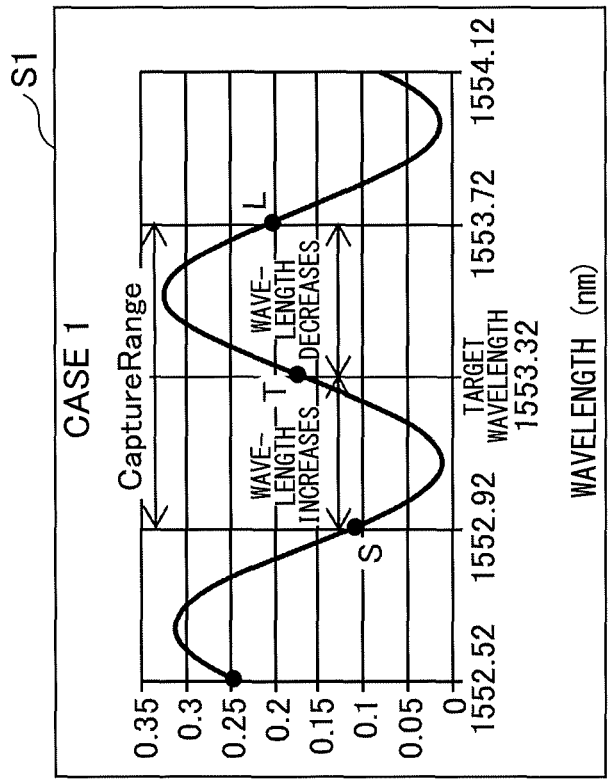

As illustrated in FIG. 9A, in the first state S1, the first transmittance corresponding to the target wavelength T is between the second transmittance and the third transmittance. Therefore, the control direction (increase or decrease the wavelength) can be determined by comparing the output transmittance corresponding to the estimated wavelength of the output light with the first transmittance corresponding to the target wavelength T. That is, the control direction determiner 515 determines to increase the wavelength of the output light of the tunable light source 1 when the output transmittance is lower than the first transmittance, and determines to decrease the wavelength of the output light of the tunable light source 1 when the output transmittance is higher than the first transmittance.

If the control state of the wavelength filter 20 is not the first state S1 (NO at S301), the control direction determiner 515 determines whether the control state of the wavelength filter 20 is the second state S2 (S305). If the control state of the wavelength filter 20 is the second state S2 (YES at S305), the control direction determiner 515 determines whether the output transmittance corresponding to the wavelength of the output light estimated at step S107 is lower than the first transmittance corresponding to the target wavelength T (S306). If the output transmittance is higher than the first transmittance corresponding to the target wavelength T (NO at S306), the control direction determiner 515 determines to decrease the wavelength of the output light of the tunable light source 1 (S303).

If the output transmittance is lower than the first transmittance corresponding to the target wavelength T (YES at S306), the control direction determiner 515 determines whether the output transmittance is higher than the third transmittance corresponding to the longer-wavelength limit L of the control range (S307). If the output transmittance is lower than the third transmittance (NO at S307), the control direction determiner 515 determines to increase the wavelength of the output light of the tunable light source 1 (S304).

If the output transmittance is higher than the third transmittance (YES at S307), the control direction determiner 515 controls the ring filter 14 to slightly increase the wavelength of the output light (S308). Then, the control direction determiner 515 determines whether the output transmittance has increased as a result of step S308 (S309). If the output transmittance has increased as a result of step S308 (YES at S309), the control direction determiner 515 determines to increase the wavelength of the output light of the tunable light source 1 (S304). If the output transmittance has decreased as a result of step S308 (NO at S309), the control direction determiner 515 determines to decrease the wavelength of the output light of the tunable light source 1 (S303).

As illustrated in FIG. 9B, in the second state S2, when the output transmittance is lower than the first transmittance corresponding to the target wavelength T and higher than the third transmittance corresponding to the longer-wavelength limit L of the control range, the wavelength of the output light is either shorter than or longer than the target wavelength T. In the second state S2, when the output transmittance is lower than the first transmittance and higher than the third transmittance and the wavelength of the output light is shorter than the target wavelength T, the output transmittance increases as the wavelength of the output light increases. On the other hand, when the output transmittance is lower than the first transmittance and higher than the third transmittance and the wavelength of the output light is longer than the target wavelength T, the output transmittance decreases as the wavelength of the output light increases.

For the above reason, in the second state S2, when the output transmittance is lower than the first transmittance and higher than the third transmittance, the control direction determiner 515 determines whether the wavelength of the output light is longer than the target wavelength T based on a change in the output transmittance that is caused by slightly increasing the wavelength of the output light. If the output transmittance increases as a result of slightly increasing the wavelength of the output light, the control direction determiner 515 determines that the wavelength of the output light is shorter than the target wavelength T and determines to increase the wavelength of the output light of the tunable light source 1. On the other hand, if the output transmittance decreases as a result of slightly increasing the wavelength of the output light, the control direction determiner 515 determines that the wavelength of the output light is longer than the target wavelength T and determines to decrease the wavelength of the output light of the tunable light source 1.

If the control state of the wavelength filter 20 is not the second state S2 (NO at S305), the control direction determiner 515 determines whether the control state of the wavelength filter 20 is the third state S3 (S310). If the control state of the wavelength filter 20 is the third state S3 (YES at S310), the control direction determiner 515 determines whether the output transmittance corresponding to the wavelength of the output light estimated at step S107 is higher than the first transmittance corresponding to the target wavelength T (S311). If the output transmittance is lower than the first transmittance corresponding to the target wavelength T (NO at S311), the control direction determiner 515 determines to increase the wavelength of the output light of the tunable light source 1 (S304). If the output transmittance is higher than the first transmittance corresponding to the target wavelength T (YES at S311), the control direction determiner 515 determines whether the output transmittance is lower than the second transmittance corresponding to the shorter-wavelength limit S of the control range (S312). If the output transmittance is higher than the second transmittance (NO at S312), the control direction determiner 515 determines to decrease the wavelength of the output light of the tunable light source 1 (S303).

If the output transmittance is lower than the second transmittance (YES at S312), the control direction determiner 515 controls the ring filter 14 to slightly increase the wavelength of the output light (S313). Then, the control direction determiner 515 determines whether the output transmittance has increased as a result of step S313 (S314). If the output transmittance has increased as a result of step S313 (YES at S314), the control direction determiner 515 determines to decrease the wavelength of the output light of the tunable light source 1 (S303). If the output transmittance has decreased as a result of step S313 (NO at S314), the control direction determiner 515 determines to increase the wavelength of the output light of the tunable light source 1 (S304).

Figure 9D:
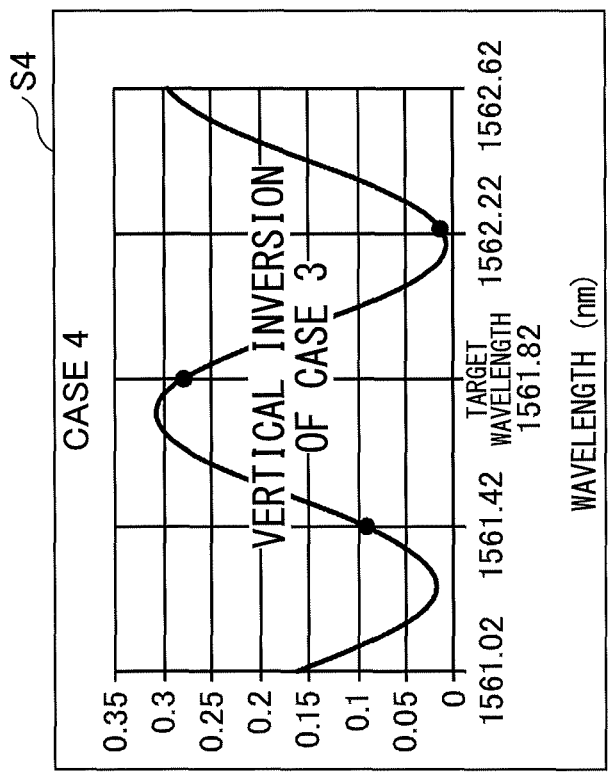
Figure 9C:
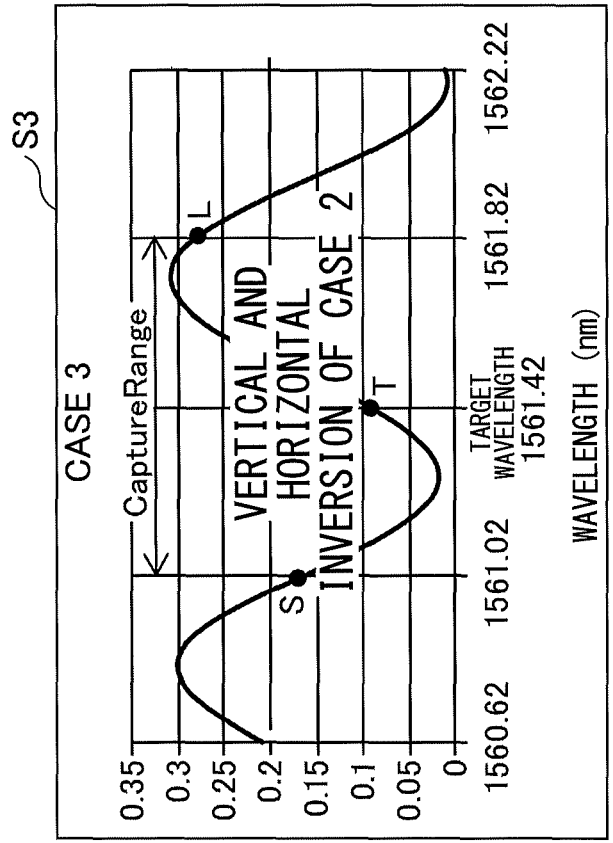

As illustrated in FIG. 9C, in the third state S3, when the output transmittance is higher than the first transmittance corresponding to the target wavelength T and lower than the second transmittance corresponding to the shorter-wavelength limit S of the control range, the wavelength of the output light is either shorter than or longer than the target wavelength T. In the third state S3, when the output transmittance is higher than the first transmittance and lower than the second transmittance and the wavelength of the output light is shorter than the target wavelength T, the output transmittance decreases as the wavelength of the output light increases. On the other hand, when the output transmittance is higher than the first transmittance and lower than the second transmittance and the wavelength of the output light is longer than the target wavelength T, the output transmittance increases as the wavelength of the output light increases.

For the above reason, in the third state S3, when the output transmittance is higher than the first transmittance and lower than the second transmittance, the control direction determiner 515 determines whether the wavelength of the output light is longer than the target wavelength T based on a change in the output transmittance that is caused by slightly increasing the wavelength of the output light. If the output transmittance increases as a result of slightly increasing the wavelength of the output light, the control direction determiner 515 determines that the wavelength of the output light is longer than the target wavelength T and determines to decrease the wavelength of the output light of the tunable light source 1. If the output transmittance decreases as a result of slightly increasing the wavelength of the output light, the control direction determiner 515 determines that the wavelength of the output light is shorter than the target wavelength T and determines to increase the wavelength of the output light of the tunable light source 1.

If the control state of the wavelength filter 20 is not the third state S3 (NO at S310), the control direction determiner 515 determines whether the control state of the wavelength filter 20 is the fourth state S4 (S315). If the control state of the wavelength filter 20 is the fourth state S4 (YES at S315), the control direction determiner 515 determines whether the output transmittance corresponding to the wavelength of the output light estimated at step S107 is lower than the first transmittance corresponding to the target wavelength T (S316). If the output transmittance is higher than the first transmittance corresponding to the target wavelength T (NO at S316), the control direction determiner 515 determines to increase the wavelength of the output light of the tunable light source 1 (S304). If the output transmittance is lower than the first transmittance corresponding to the target wavelength T (YES at S316), the control direction determiner 515 determines whether the output transmittance is higher than the second transmittance corresponding to the shorter-wavelength limit S of the control range (S317). If the output transmittance is lower than the second transmittance (NO at S317), the control direction determiner 515 determines to decrease the wavelength of the output light of the tunable light source 1 (S303).

If the output transmittance is higher than the second transmittance (YES at S317), the control direction determiner 515 controls the ring filter 14 to slightly increase the wavelength of the output light (S318). Then, the control direction determiner 515 determines whether the output transmittance has increased as a result of step S318 (S319). If the output transmittance has increased as a result of step S313 (YES at S319), the control direction determiner 515 determines to increase the wavelength of the output light of the tunable light source 1 (S304). If the output transmittance has decreased as a result of step S313 (NO at S319), the control direction determiner 515 determines to decrease the wavelength of the output light of the tunable light source 1 (S303).

As illustrated in FIG. 9D, in the fourth state S4, when the output transmittance is lower than the first transmittance corresponding to the target wavelength T and higher than the second transmittance corresponding to the shorter-wavelength limit S of the control range, the wavelength of the output light is either shorter than or longer than the target wavelength T. In the fourth state S4, when the output transmittance is lower than the first transmittance and higher than the second transmittance and the wavelength of the output light is shorter than the target wavelength T, the output transmittance increases as the wavelength of the output light increases. On the other hand, when the output transmittance is lower than the first transmittance and higher than the second transmittance and the wavelength of the output light is longer than the target wavelength T, the output transmittance decreases as the wavelength of the output light increases.

For the above reason, in the fourth state S4, when the output transmittance is lower than the first transmittance and higher than the second transmittance, the control direction determiner 515 determines whether the wavelength of the output light is longer than the target wavelength T based on a change in the output transmittance that is caused by slightly increasing the wavelength of the output light. If the output transmittance decreases as a result of slightly increasing the wavelength of the output light, the control direction determiner 515 determines that the wavelength of the output light is longer than the target wavelength T and determines to decrease the wavelength of the output light of the tunable light source 1. On the other hand, if the output transmittance increases as a result of slightly increasing the wavelength of the output light, the control direction determiner 515 determines that the wavelength of the output light is shorter than the target wavelength T and determines to increase the wavelength of the output light of the tunable light source 1.

If the control state of the wavelength filter 20 is not the fourth state S4 (NO at S315), the control direction determiner 515 determines whether the control state of the wavelength filter 20 is the fifth state S5 (S320). If the control state of the wavelength filter 20 is the fifth state S5 (YES at S320), the control direction determiner 515 determines whether the output transmittance corresponding to the wavelength of the output light estimated at step S107 is higher than the first transmittance corresponding to the target wavelength T (S321). If the output transmittance is lower than the first transmittance corresponding to the target wavelength T (NO at S321), the control direction determiner 515 determines to decrease the wavelength of the output light of the tunable light source 1 (S303). If the output transmittance is higher than the first transmittance corresponding to the target wavelength T (YES at S321), the control direction determiner 515 determines whether the output transmittance is lower than the third transmittance corresponding to the longer-wavelength limit L of the control range (S322). If the output transmittance is higher than the third transmittance (NO at S322), the control direction determiner 515 determines to increase the wavelength of the output light of the tunable light source 1 (S304).

If the output transmittance is lower than the third transmittance (YES at S322), the control direction determiner 515 controls the ring filter 14 to slightly increase the wavelength of the output light (S323). Then, the control direction determiner 515 determines whether the output transmittance has increased as a result of step S323 (S324). If the output transmittance has increased as a result of step S323 (YES at S324), the control direction determiner 515 determines to decrease the wavelength of the output light of the tunable light source 1 (S303). If the output transmittance has decreased as a result of step S323 (NO at S324), the control direction determiner 515 determines to increase the wavelength of the output light of the tunable light source 1 (S304).

Figure 9E:
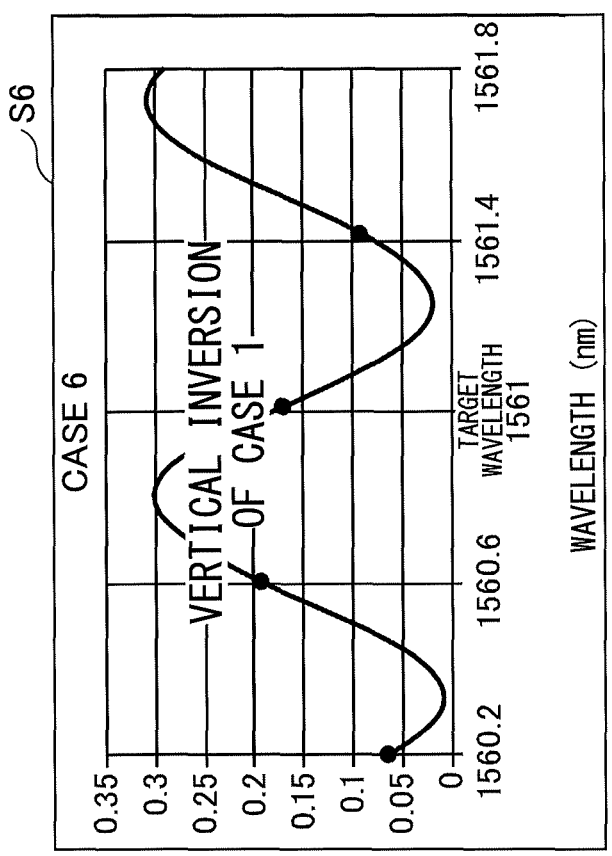

As illustrated in FIG. 9E, in the fifth state S5, when the output transmittance is higher than the first transmittance corresponding to the target wavelength T and lower than the third transmittance corresponding to the longer-wavelength limit L of the control range, the wavelength of the output light is either shorter than or longer than the target wavelength T. In the fifth state S5, when the output transmittance is higher than the first transmittance and lower than the third transmittance and the wavelength of the output light is shorter than the target wavelength T, the output transmittance decreases as the wavelength of the output light increases. On the other hand, when the output transmittance is higher than the first transmittance and lower than the third transmittance and the wavelength of the output light is longer than the target wavelength T, the output transmittance increases as the wavelength of the output light increases.

For the above reason, in the fifth state S5, when the output transmittance is higher than the first transmittance and lower than the third transmittance, the control direction determiner 515 determines whether the wavelength of the output light is longer than the target wavelength T based on a change in the output transmittance that is caused by slightly increasing the wavelength of the output light. If the output transmittance increases as a result of slightly increasing the wavelength of the output light, the control direction determiner 515 determines that the wavelength of the output light is longer than the target wavelength T and determines to decrease the wavelength of the output light of the tunable light source 1. If the output transmittance decreases as a result of slightly increasing the wavelength of the output light, the control direction determiner 515 determines that the wavelength of the output light is shorter than the target wavelength T and determines to increase the wavelength of the output light of the tunable light source 1.

If the control state of the wavelength filter 20 is not the fifth state S5 (NO at S320), the control direction determiner 515 determines whether the output transmittance corresponding to the wavelength of the output light estimated at step S107 is higher than the first transmittance corresponding to the target wavelength T (S325). If the output transmittance is higher than the first transmittance corresponding to the target wavelength T (YES at S325), the control direction determiner 515 determines to increase the wavelength of the output light of the tunable light source 1 (S304). If the output transmittance is lower than the first transmittance corresponding to the target wavelength T (NO at S325), the control direction determiner 515 determines to decrease the wavelength of the output light of the tunable light source 1 (S303).

Figure 9F:
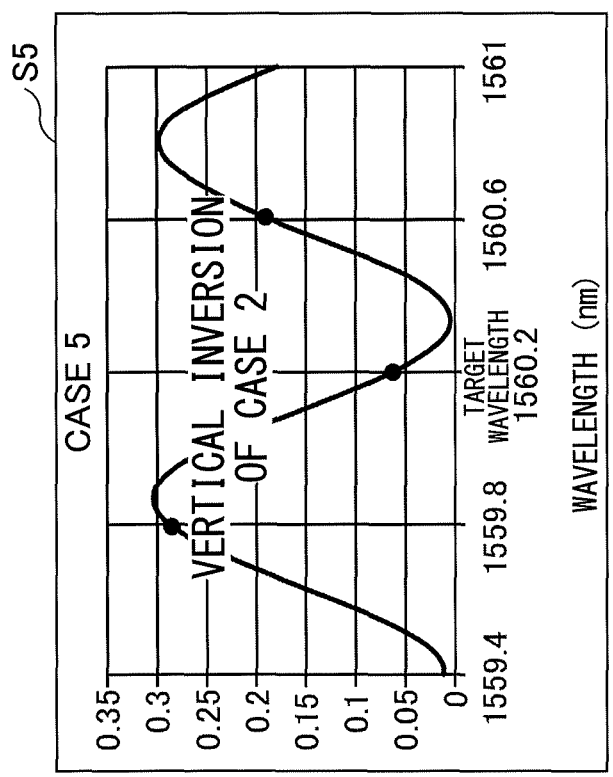

As illustrated in FIG. 9F, in the sixth state S6, the first transmittance corresponding to the target wavelength T is between the second transmittance and the third transmittance. Therefore, the control direction (increase or decrease the wavelength) can be determined by comparing the output transmittance corresponding to the estimated wavelength of the output light with the first transmittance corresponding to the target wavelength T. That is, the control direction determiner 515 determines to decrease the wavelength of the output light of the tunable light source 1 when the output transmittance is lower than the first transmittance, and determines to increase the wavelength of the output light of the tunable light source 1 when the output transmittance is higher than the first transmittance.

When the control direction determiner 515 determines to decrease the wavelength of the output light of the tunable light source 1 at step S108 (YES at S109), the wavelength control signal outputter 516 outputs a wavelength control signal to decrease the wavelength of the output light to the optical unit 101 (S110). In response to the wavelength control signal, a heater (not shown) of the optical unit 101 adjusts the temperature of the ring filter 14 such that the wavelength of the output light is decreased.

When the control direction determiner 515 determines to increase the wavelength of the output light of the tunable light source 1 at step S108 (NO at S109), the wavelength control signal outputter 516 outputs a wavelength control signal to increase the wavelength of the output light to the optical unit 101 (S111). In response to the wavelength control signal, the heater of the optical unit 101 adjusts the temperature of the ring filter 14 such that the wavelength of the output light is increased.

When the characteristic determiner 512 determines to use the electric current corresponding to the second wavelength detection signal for the wavelength control process (NO at step S105), the process proceeds to step S112. Steps S112 through S117 are substantially the same as steps S106 through S111 except that the electric current corresponding to the second wavelength detection signal is used for the wavelength control process. Therefore, detailed descriptions of steps S112 through S117 are omitted here.

The output controller 502 obtains, from the optical unit 101, an output detection signal indicating an electric current supplied from the power monitor 15 according to the quantity of the output light, and controls the quantity of the output light based on the electric current corresponding to the obtained output detection signal. For example, the output controller 502 determines the quantity of the output light based on the electric current corresponding to the output detection signal and a table stored in the storage 503 indicating a relationship between electric currents and light quantities, and compares the determined quantity of the output light with a target light quantity stored in the storage 503.

When the quantity of the output light is greater than the target light quantity, the output controller 502 outputs, to the optical unit 101, a first output control signal and a second output control signal to decrease the quantity of the output light. When the quantity of the output light is less than the target light quantity, the output controller 502 outputs, to the optical unit 101, a first output control signal and a second output control signal to increase the quantity of the output light.

The first output control signal is, for example, an electric current supplied to the light source 10 of the optical unit 101. The second output control signal is for example, an electric current supplied to an amplifier (not shown) of the optical unit 101. The output controller 502 may be configured to control the quantity of the output light by alternately outputting the first output control signal and the second output control signal or by changing electric currents corresponding to the first output control signal and the second output control signal at predetermined rates.

Effects of Tunable Light Source of First Embodiment

In the tunable light source 1 of the first embodiment, the wavelength of output light is controlled by a control signal generated based on the output transmittance, the first transmittance, the second transmittance, and the third transmittance. This configuration makes it possible to control the wavelength of output light without controlling the light transmission characteristic of a wavelength filter disposed on a substrate.

Specifically, in the tunable light source 1 of the first embodiment, the control signal is generated based on the output transmittance, the first transmittance, the second transmittance, the third transmittance, and a control state of the wavelength filter that is determined based on the first transmittance, the second transmittance, and the third transmittance. In the tunable light source 1 of the first embodiment, the control state of the wavelength filter is determined based on the first transmittance corresponding to a target wavelength and the second and third transmittances defining the limits of a predetermined control range. This configuration makes it possible to control the wavelength of output light as desired even if the FSR of a wavelength monitor changes.

In the tunable light source 1 of the first embodiment, when the first transmittance is not between the second transmittance and the third transmittance, the wavelength of output light is controlled based on a change in the output transmittance that is caused by changing the wavelength of output light. This configuration makes it possible to control the wavelength of output light without being affected by the FSR of the wavelength monitor.

Configuration and Functions of Tunable Light Source of Second Embodiment

Figure 13A:
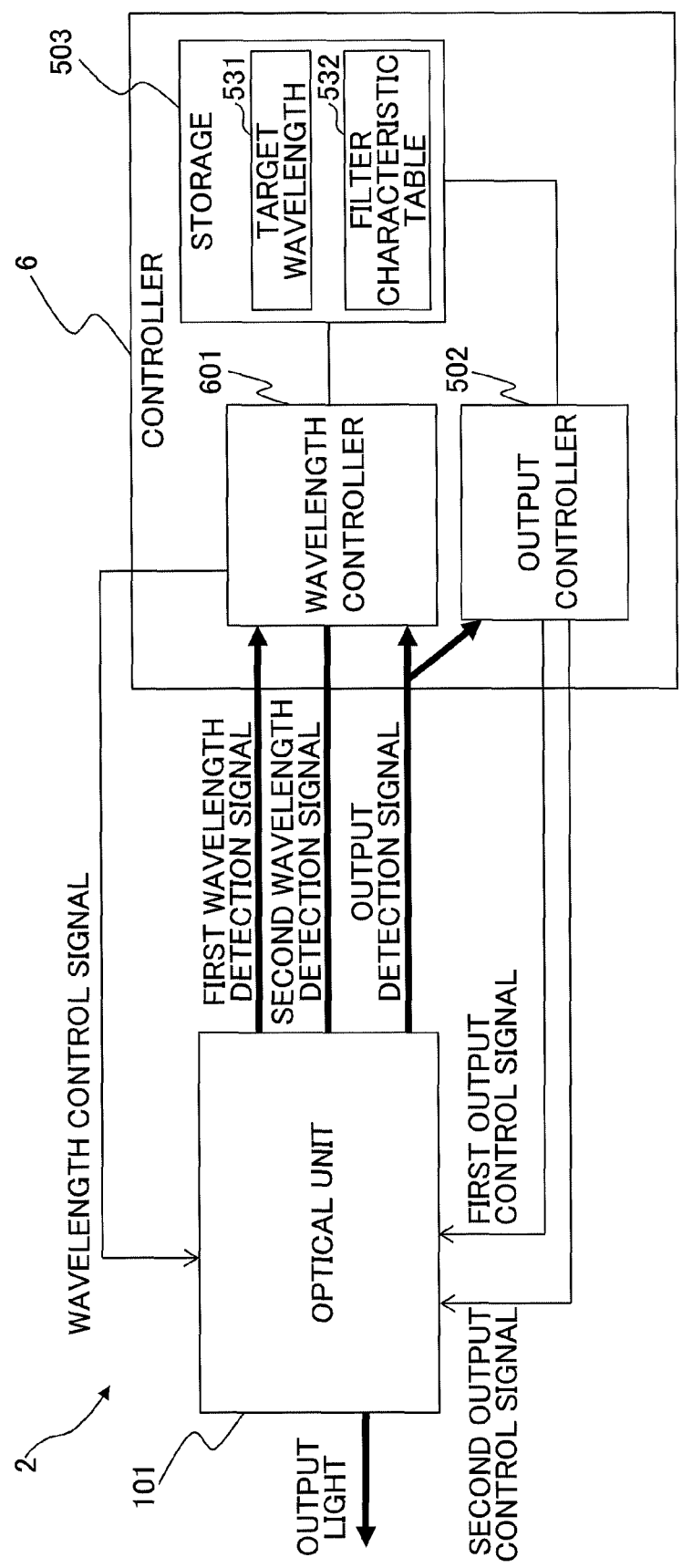
FIG. 13A is a block diagram of a tunable light source according to a second embodiment.
Figure 13B:
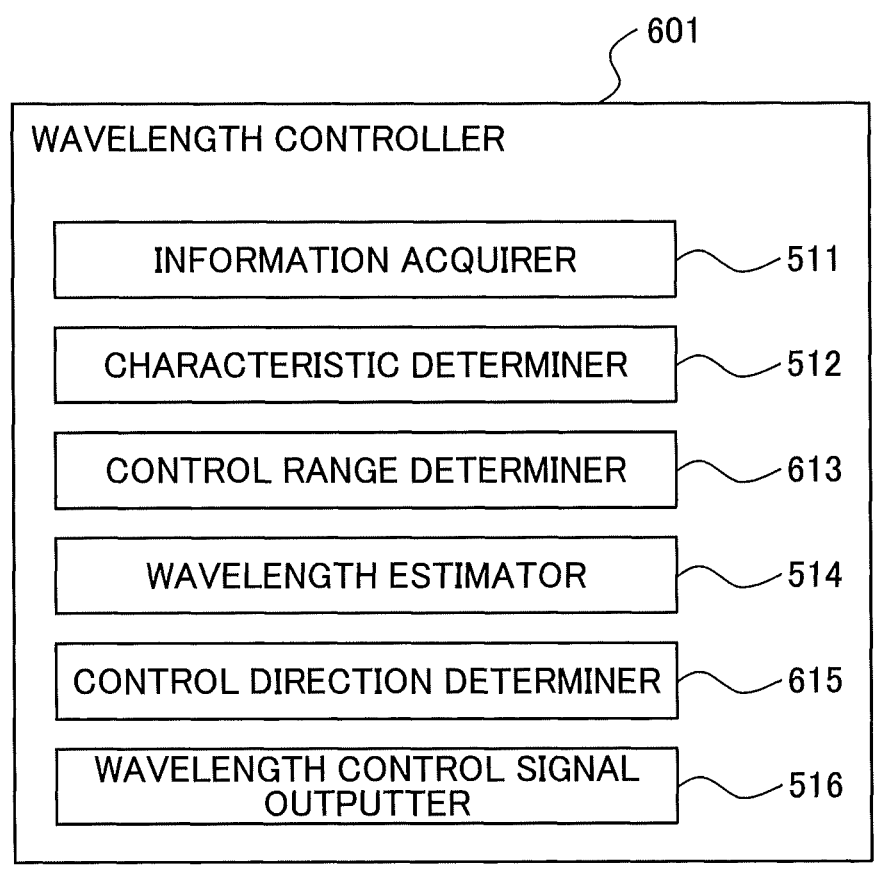
FIG. 13B is a functional block diagram of a wavelength controller in FIG. 13A.

FIG. 13A is a block diagram of a tunable light source 2 according to a second embodiment, and FIG. 13B is a functional block diagram of a wavelength controller 601 in FIG. 13A.

The tunable light source 2 is different from the tunable light source 1 in that the controller 5 is replaced with a controller 6. The controller 6 is different from the controller 5 in that the wavelength controller 501 is replaced with a wavelength controller 601. The configurations and functions of components of the controller 6 other than the wavelength controller 601 are substantially the same as those of the corresponding components of the controller 5, and therefore detailed descriptions of those components are omitted here.

The wavelength controller 601 is different from the wavelength controller 501 in that the control state determiner 513 and the control direction determiner 515 are replaced with a control range determiner 613 and a control direction determiner 615.

Figure 14:
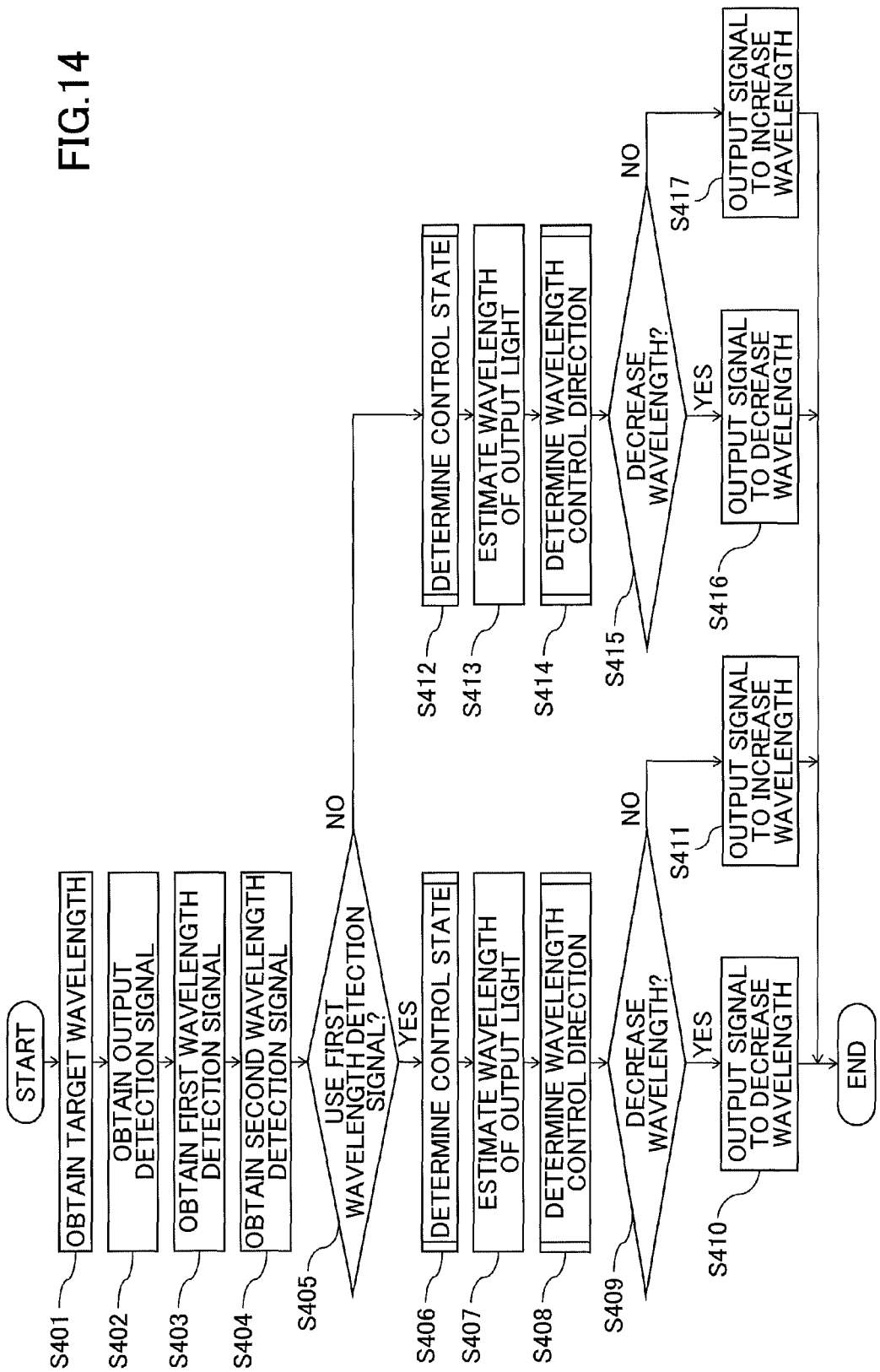
FIG. 14 is a flowchart illustrating a wavelength control process performed by a wavelength controller illustrated by FIG. 13B.

FIG. 14 is a flowchart illustrating a wavelength control process performed by the wavelength controller 601. The wavelength control process of FIG. 14 is executed by a logic circuit implementing the wavelength controller 601.

Steps S401 through S405 in FIG. 14 are substantially the same as steps S101 through S105 in FIG. 8, and therefore descriptions of those steps are omitted here. The control range determiner 613 determines a control range for controlling the wavelength of output light of the tunable light source 2 such that a first transmittance, a second transmittance, and a third transmittance become the same (S406).

Figure 15:
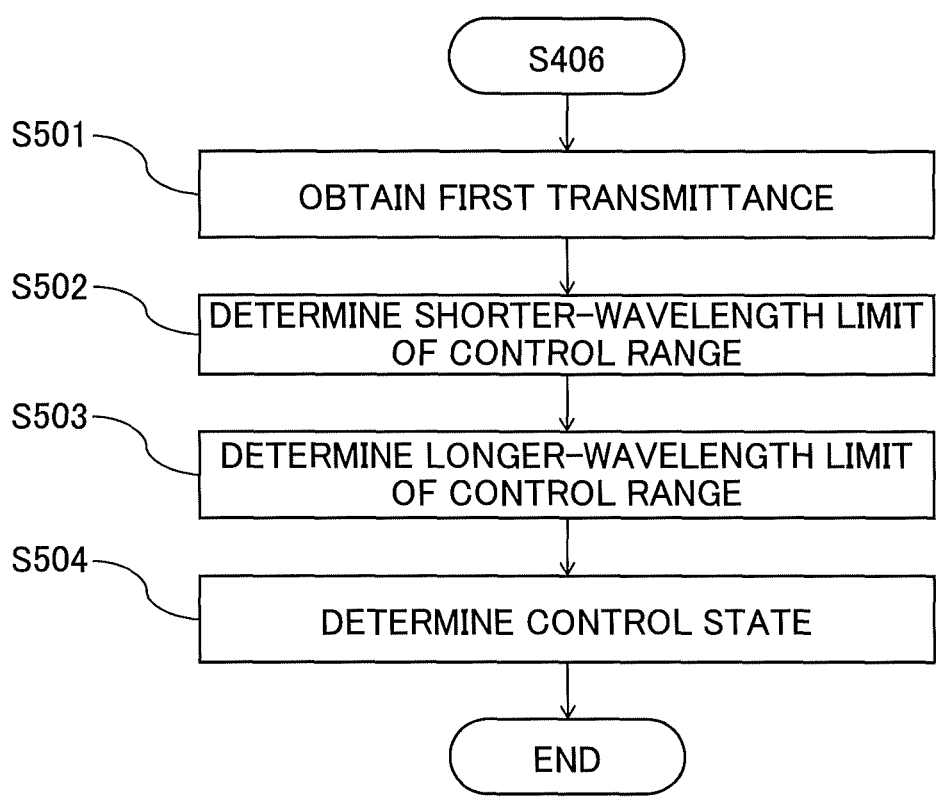
FIG. 15 is a flowchart illustrating details of step S406 in FIG. 14.

FIG. 15 is a flowchart illustrating details of step S406 in FIG. 14.

The control range determiner 613 obtains a first transmittance corresponding to the target wavelength T by referring to the filter characteristic table 532 (S501). Next, the control range determiner 613 refers to the filter characteristic table 532 to determine, as a shorter-wavelength limit S, a wavelength that is shorter than the target wavelength T and corresponds to a transmittance that is the same as the first transmittance (S502). Next, the control range determiner 613 refers to the filter characteristic table 532 to determine, as a longer-wavelength limit L, a wavelength that is longer than the target wavelength T and corresponds to a transmittance that is the same as the first transmittance (S503). Then, in the control range defined by the shorter-wavelength limit S and the longer-wavelength limit L determined by steps S501 through S503, the control range determiner 613 determines whether the control state of the wavelength filter 20 is a first state or a second state different from the first state (S504).

Figure 16A:
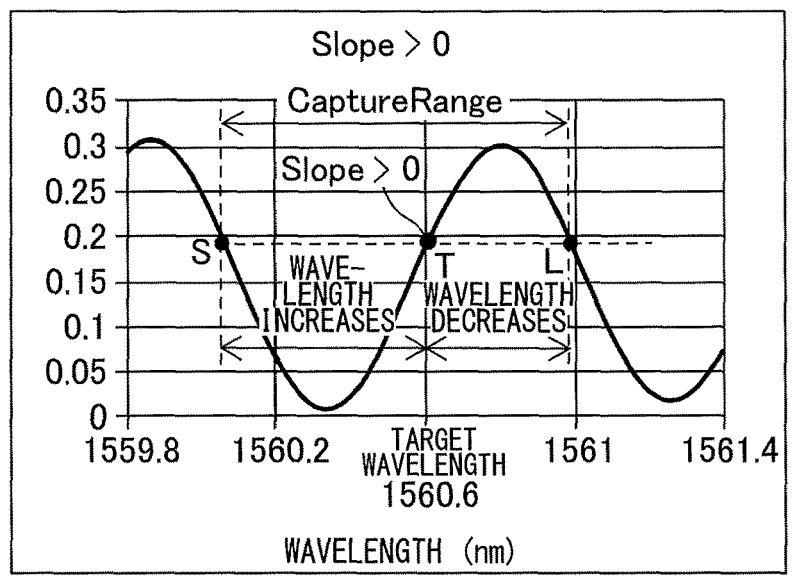
FIG. 16A is a graph illustrating a control range in a case where the control state of a wavelength filter is a first state.
Figure 16B:
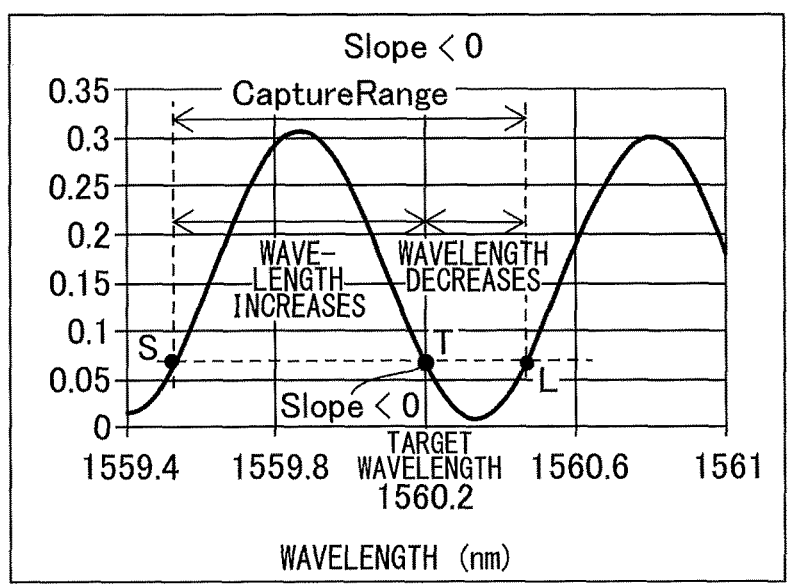
FIG. 16B is a graph illustrating a control range in a case where the control state of a wavelength filter is a second state.

FIG. 16A is a graph illustrating a control range in a case where the control state of the wavelength filter is the first state, and FIG. 16B is a graph illustrating a control range in a case where the control state of a wavelength filter is the second state. In each of FIGS. 15A and 15B, the control range is indicated by a bidirectional arrow "CaptureRange".

In the first state illustrated by FIG. 16A, near the target wavelength T, the optical transmittance of the wavelength filter 20 monotonically increases as the wavelength of the output light of the tunable light source 2 increases. In the control range of the first state, when the wavelength of the output light is longer than the target wavelength T, the output transmittance is higher than the first transmittance corresponding to the target wavelength T. Also, in the control range of the first state, when the wavelength of the output light is shorter than the target wavelength T, the output transmittance is lower than the first transmittance corresponding to the target wavelength T.

In the second state illustrated by FIG. 16B, near the target wavelength T, the optical transmittance of the wavelength filter 20 monotonically decreases as the wavelength of the output light of the tunable light source 2 increases. In the control range of the second state, when the wavelength of the output light is longer than the target wavelength T, the output transmittance is lower than the first transmittance corresponding to the target wavelength T. Also, in the control range of the second state, when the wavelength of the output light is shorter than the target wavelength T, the output transmittance is higher than the first transmittance corresponding to the target wavelength T.

The control range determiner 613 refers to the filter characteristic table 532 to determine whether the optical transmittance of the wavelength filter 20 monotonically increases as the wavelength of the output light increases near the target wavelength T, and thereby determine whether the control state is the first state or the second state.

When the control range for controlling the wavelength of the output light of the tunable light source 2 is determined by the control range determiner 613 (S406), the wavelength estimator 514 estimates the wavelength of output light output from the optical unit 101 by using an electric current corresponding to the first wavelength detection signal (S407).

Next, based on the output transmittance and the first transmittance, the control direction determiner 615 determines whether to decrease or increase the wavelength of the output light of the tunable light source 2 (S408).

Figure 17:
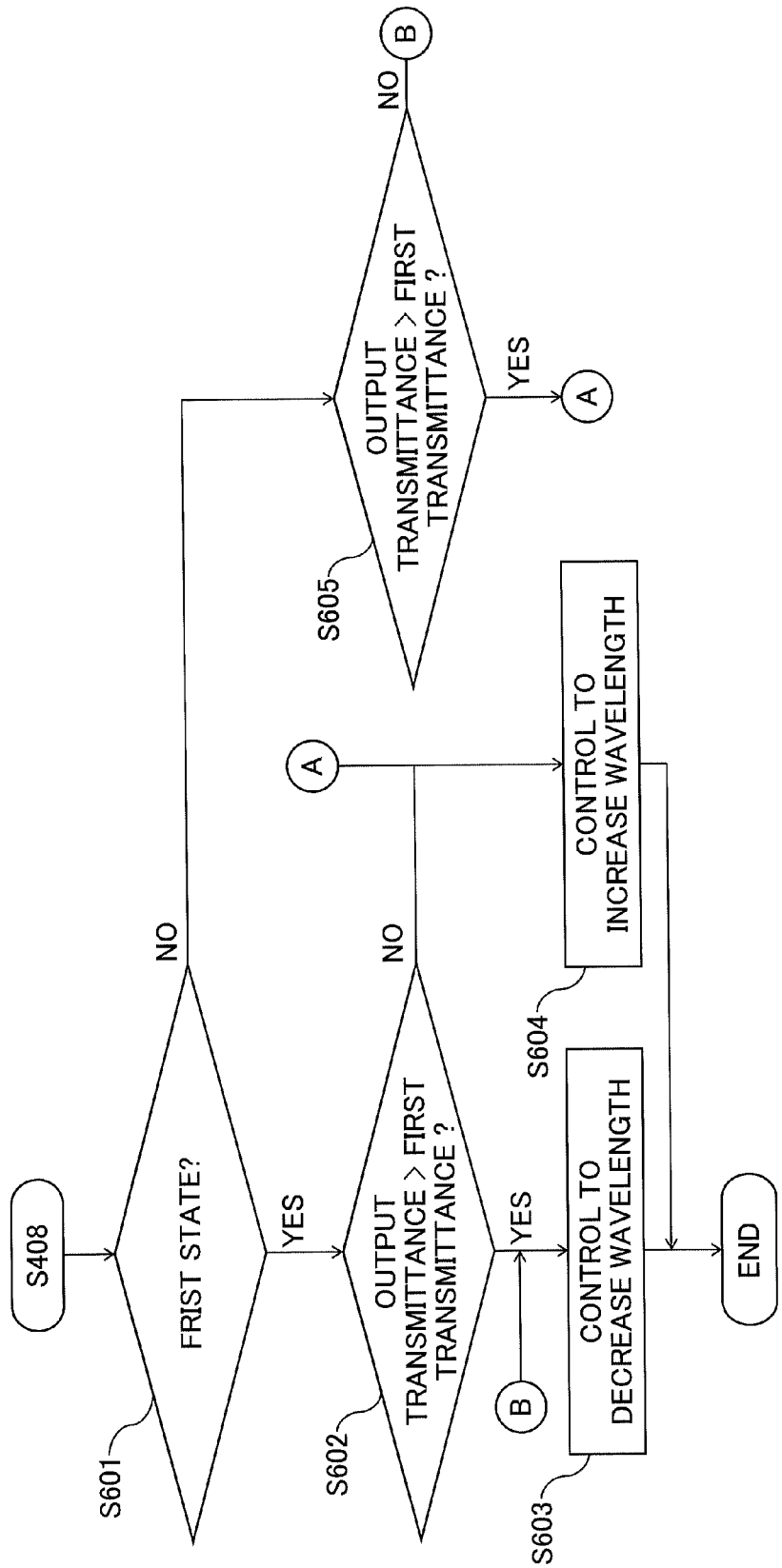
FIG. 17 is a flowchart illustrating details of step S408 in FIG. 14.

FIG. 17 is a flowchart illustrating details of step S408 in FIG. 14.

First, the control direction determiner 615 determines whether the control state of the wavelength filter 20 is the first state or the second state (S601).

If the control state of the wavelength filter 20 is the first state (YES at S601), the control direction determiner 615 determines whether an output transmittance corresponding to the wavelength of the output light estimated at step S407 is higher than the first transmittance corresponding to the target wavelength T (S602). If the output transmittance is higher than the first transmittance corresponding to the target wavelength T (YES at S602), the control direction determiner 615 determines to decrease the wavelength of the output light of the tunable light source 2 (S603). If the output transmittance is lower than the first transmittance corresponding to the target wavelength T (NO at S602), the control direction determiner 515 determines to increase the wavelength of the output light of the tunable light source 2 (S604).

If the control state of the wavelength filter 20 is the second state (NO at S601), the control direction determiner 615 determines whether the output transmittance corresponding to the wavelength of the output light estimated at step S407 is higher than the first transmittance corresponding to the target wavelength T (S605). If the output transmittance is higher than the first transmittance corresponding to the target wavelength T (YES at S605), the control direction determiner 615 determines to increase the wavelength of the output light of the tunable light source 2 (S604). If the output transmittance is lower than the first transmittance corresponding to the target wavelength T (NO at S605), the control direction determiner 515 determines to decrease the wavelength of the output light of the tunable light source 2 (S603).

When the characteristic determiner 512 determines to use the electric current corresponding to the second wavelength detection signal for the wavelength control process (NO at step S405), the process proceeds to step S412. Steps S412 through S417 are substantially the same as steps S406 through S411 except that the electric current corresponding to the second wavelength detection signal is used for the wavelength control process. Therefore, detailed descriptions of steps S412 through S417 are omitted here.

Effects of Tunable Light Source of Second Embodiment

In the tunable light source 2 of the second embodiment, the control range for controlling the wavelength of output light is determined such that the first transmittance, the second transmittance, and the third transmittance become the same. This configuration makes it possible to control the wavelength of output light without controlling the light transmission characteristic of a wavelength filter disposed on a substrate.

Application of Tunable Light Sources of Embodiments

Figure 18:
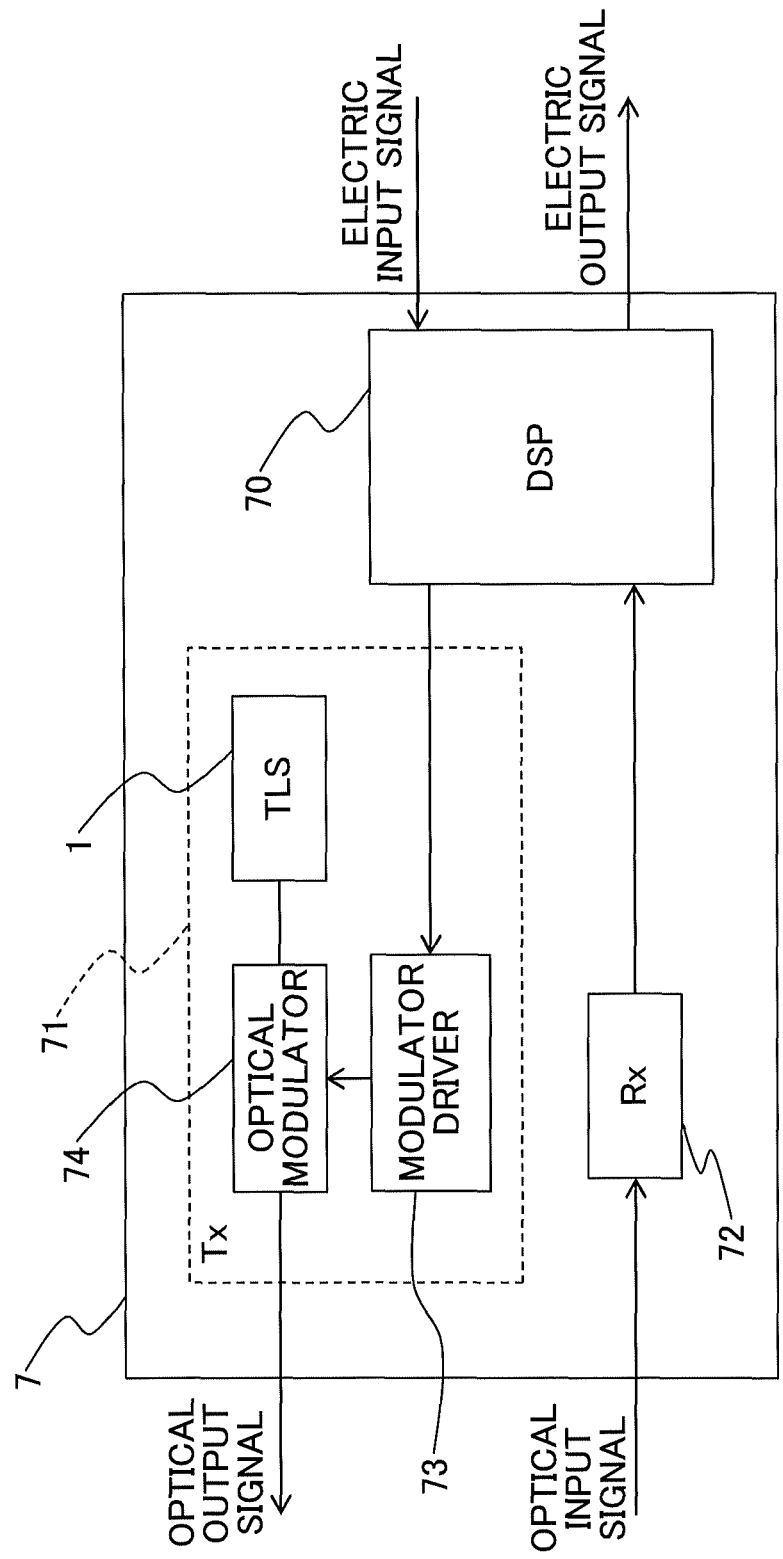
FIG. 18 is a drawing illustrating an optical module including a tunable light source according to an embodiment.

FIG. 18 is a drawing illustrating an optical module 7 including the tunable light source 1 of the first embodiment. The tunable light source 1 may be replaced with the tunable light source 2 of the second embodiment.

The optical module 7 includes a digital signal processor (DSP) 70, a transmitter 71, and a receiver 72. The transmitter 71 includes the tunable light source 1, a modulator driver 73, and an optical modulator 74.

The DSP 70 receives an electric input signal, processes data corresponding to the electric input signal, and outputs an electric signal indicating the processed data to the modulator driver 73. The DSP 70 also receives an electric signal from the receiver 72, processes data corresponding to the received electric signal, and outputs an electric output signal indicating the processed data.

The modulator driver 73 outputs the electric signal received from the DSP 70 to the optical modulator 74. Based on the electric signal received from the modulator driver 73, the optical modulator 74 modulates output light output from the tunable light source 1, and outputs the modulated light as an optical output signal. For example, the optical modulator 74 modulates the output light according to dual polarization-quadrature phase shift keying (DP-QPSK).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A tunable light source, comprising:
a substrate;
a light source;
a wavelength selecting device that selects, according to a control signal, output light with a specific wavelength from light output from the light source;
a wavelength filter that is disposed on the substrate, filters the output light, and outputs the filtered light;
a light-receiving device that receives the filtered light from the wavelength filter; and
a controller configured to
generate the control signal based on an output transmittance corresponding to a quantity of the received light received by the light-receiving device, a first transmittance corresponding to a target wavelength, a second transmittance corresponding to a shorter-wavelength limit of a control range including the target wavelength, and a third transmittance corresponding to a longer-wavelength limit of the control range, and
output the generated control signal to the wavelength selecting device to control the wavelength of the output light without controlling a light transmission characteristic of the wavelength filter.

2. The tunable light source as claimed in claim 1, wherein the controller is further configured to
determine a control state of the wavelength filter based on the first transmittance, the second transmittance, and the third transmittance, and
determine whether to decrease or increase the wavelength of the output light based on the determined control state, the output transmittance, the first transmittance, the second transmittance, and the third transmittance.

3. The tunable light source as claimed in claim 2, wherein when the control state indicates that the first transmittance is not between the second transmittance and the third transmittance, the controller determines whether to decrease or increase the wavelength of the output light based on a change in the output transmittance that is caused by changing the wavelength of the output light.

4. The tunable light source as claimed in claim 1, wherein the controller is further configured to
determine the control range such that the first transmittance, the second transmittance, and the third transmittance become same, and
determine whether to decrease or increase the wavelength of the output light based on the output transmittance and the first transmittance.

5. A method performed by a controller of a tunable light source including
a substrate,
a light source,
a wavelength selecting device that selects, according to a control signal, output light with a specific wavelength from light output from the light source,
a wavelength filter that is disposed on the substrate, filters the output light, and outputs the filtered light, and
a light-receiving device that receives the filtered light from the wavelength filter,
the method comprising
obtaining a target wavelength of the output light;
estimating an output transmittance of the output light based on a quantity of the received light received by the light-receiving device;
generating the control signal based on the output transmittance, a first transmittance corresponding to the target wavelength, a second transmittance corresponding to a shorter-wavelength limit of a control range including the target wavelength, and a third transmittance corresponding to a longer-wavelength limit of the control range; and outputting the generated control signal to the wavelength selecting device to control the wavelength of the output light without controlling a light transmission characteristic of the wavelength filter.

6. An optical module, comprising:
a tunable light source; and
an optical modulator that modulates output light output from the tunable light source and outputs the modulated light, wherein
the tunable light source includes
a substrate,
a light source,
a wavelength selecting device that selects, according to a control signal, the output light with a specific wavelength from light output from the light source,
a wavelength filter that is disposed on the substrate, filters the output light, and outputs the filtered light,
a light-receiving device that receives the filtered light from the wavelength filter, and
a controller configured to
generate the control signal based on an output transmittance corresponding to a quantity of the received light received by the light-receiving device, a first transmittance corresponding to a target wavelength, a second transmittance corresponding to a shorter-wavelength limit of a control range including the target wavelength, and a third transmittance corresponding to a longer-wavelength limit of the control range, and
output the generated control signal to the wavelength selecting device to control the wavelength of the output light without controlling a light transmission characteristic of the wavelength filter.

* * * * *